US012582180B2

(12) United States Patent
Czajka et al.

(10) Patent No.: US 12,582,180 B2
(45) **Date of Patent: *Mar. 24, 2026**

(54) PROTECTIVE APPAREL AND SUPPORT APPARATUS AND METHOD OF USE

(71) Applicant: Medline Industries, LP, Northfield, IL (US)

(72) Inventors: Francis A Czajka, Libertyville, IL (US); Troy Lother, Kenosha, WI (US); John H. Kutsch, Harvard, IL (US); Vince Lackowski, Racine, WI (US)

(73) Assignee: Medline Industries, LP, Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,541

(22) Filed: Aug. 15, 2024

(65) Prior Publication Data

US 2024/0407486 A1 Dec. 12, 2024

Related U.S. Application Data

(60) Continuation of application No. 18/101,946, filed on Jan. 26, 2023, now Pat. No. 12,063,991, which is a
(Continued)

(51) Int. Cl.
*A41D 13/12* (2006.01)
*A41D 13/002* (2006.01)
(Continued)

(52) U.S. Cl.
CPC ..... *A41D 13/1218* (2013.01); *A41D 13/0025* (2013.01); *A41D 13/1153* (2013.01);
(Continued)

(58) Field of Classification Search
CPC ............ A41D 13/0025; A41D 13/1218; A41D 13/1153; A41D 13/1209; A41D 13/1184;
(Continued)

(56) References Cited

U.S. PATENT DOCUMENTS 932,880 A 8/1909 Meikle
1,004,850 A 10/1911 Cogil
(Continued)

FOREIGN PATENT DOCUMENTS

DE 2442881 A1 3/1976
EP 236620 A1 9/1987
(Continued)

OTHER PUBLICATIONS

International Search Report and Written Opinion mailed Jun. 22, 2012 for PCT Application No. PCT/US2012/030107.
(Continued)

*Primary Examiner* — Amy Vanatta
(74) *Attorney, Agent, or Firm* — SandBright, PLLC; Robert D. Spendlove

(57) ABSTRACT

A protective apparel support system is disclosed comprising a support frame configured to rest on the shoulders of a wearer, the support having a first shoulder member, a second shoulder member and a shield engagement portion. A shield is selectively coupleable to the support and protective apparel is coupled to the shield.

20 Claims, 30 Drawing Sheets

Related U.S. Application Data continuation of application No. 17/369,845, filed on Jul. 7, 2021, now Pat. No. 11,564,427, which is a continuation of application No. 16/653,621, filed on Oct. 15, 2019, now Pat. No. 11,083,232, which is a continuation of application No. 15/850,176, filed on Dec. 21, 2017, now Pat. No. 10,448,685, which is a continuation-in-part of application No. 15/284,943, filed on Oct. 4, 2016, now Pat. No. 9,854,858, which is a division of application No. 13/709,783, filed on Dec. 10, 2012, now Pat. No. 9,480,290, which is a continuation-in-part of application No. 13/427,475, filed on Mar. 22, 2012, now Pat. No. 8,950,017.

(60) Provisional application No. 61/466,334, filed on Mar. 22, 2011.

(51) Int. Cl.

*A41D 13/11* (2006.01)
*A62B 17/00* (2006.01)
*A62B 18/00* (2006.01)
*A62B 18/04* (2006.01)

(52) U.S. Cl.

CPC ........ *A41D 13/1209* (2013.01); *A62B 17/001* (2013.01); *A62B 18/003* (2013.01); *A62B 18/045* (2013.01)

(58) Field of Classification Search

CPC A41D 13/11; A41D 13/1161; A41D 13/0512; A41D 3/00; A41D 3/08; A41D 13/0053; A41D 27/28; A41D 2400/12; A42B 3/0473; A42B 18/00; A42B 18/006; A62B 18/003; A62B 18/045; A62B 18/04; A62B 18/08; A62B 18/082; A62B 17/001; A62B 17/04; A62B 17/006; A62B 18/006; A62B 17/00; A62B 17/005; A62B 18/02; A62B 18/025; A61F 2007/0001; A61F 2007/0002; A61F 9/06; A61F 9/04; A61F 9/045

See application file for complete search history.

(56) References Cited

U.S. PATENT DOCUMENTS 1,095,089 A 4/1914 Dinn
1,191,773 A 7/1916 Dinkuhn
1,255,249 A 2/1918 Wade et al.
1,313,908 A 8/1919 Polasky
1,561,760 A 11/1925 Whelan
1,906,539 A 5/1933 Church
2,171,337 A 8/1939 Hellmann
2,456,130 A 12/1948 Lambertsen
2,460,269 A 2/1949 Appeldoorn
2,564,952 A 8/1951 Blasius
2,573,414 A 10/1951 Dunn
2,750,592 A 6/1956 Salminen
2,773,262 A 12/1956 Brouha et al.
2,904,040 A 9/1959 Hale
3,093,829 A 6/1963 Maine
3,302,214 A 2/1967 Yuritch
3,351,056 A 11/1967 Durney
3,529,594 A 9/1970 Charnley
3,625,206 A 12/1971 Charnley
3,688,314 A 9/1972 Hill
3,707,004 A 12/1972 Kapitan et al.
4,019,508 A 4/1977 Der Estephanian et al.
4,042,976 A 8/1977 Reynolds
4,116,237 A * 9/1978 Birch .................... A62B 17/04 2/5
4,194,247 A * 3/1980 Melander ........... A41D 13/0025 2/457
4,236,514 A * 12/1980 Moretti ................. A62B 17/04 2/205
4,272,851 A 6/1981 Goldstein
4,286,170 A 8/1981 Moti
4,386,277 A 5/1983 Forshee
4,513,452 A 4/1985 Rankin, Sr.
4,639,254 A 1/1987 LeGault et al.
4,672,968 A 6/1987 Lenox et al.
4,673,402 A 6/1987 Weisman et al.
4,699,620 A 10/1987 Bernardin
4,701,129 A 10/1987 Hazard
4,838,885 A 6/1989 Bernardin
4,845,779 A 7/1989 Wheeler et al.
4,859,184 A 8/1989 Hazard
4,878,046 A 10/1989 Smith
4,901,370 A * 2/1990 Suda ................... A62B 17/006 2/457
4,901,716 A 2/1990 Stackhouse et al.
5,046,492 A 9/1991 Stackhouse et al.
5,047,023 A 9/1991 Berg
5,054,480 A 10/1991 Bare et al.
5,134,007 A 7/1992 Reising et al.
5,176,668 A 1/1993 Bernardin
5,188,624 A 2/1993 Young, Sr. et al.
5,253,642 A 10/1993 Stackhouse et al.
5,294,478 A 3/1994 Wanek et al.
5,295,271 A 3/1994 Butterfield et al.
5,348,547 A 9/1994 Payne et al.
H1360 H * 10/1994 Grove ..................... 128/201.25
5,466,513 A 11/1995 Wanek et al.
5,492,110 A 2/1996 Lenz et al.
5,500,954 A 3/1996 Smith et al.
5,592,936 A 1/1997 Thomas, Jr. et al.
5,646,785 A 7/1997 Gilboa et al.
5,649,532 A 7/1997 Griffiths
5,655,374 A 8/1997 Santilli et al.
5,711,033 A 1/1998 Green et al.
6,370,695 B2 4/2002 Paris et al.
6,374,823 B1 4/2002 Hajianpour
6,393,617 B1 5/2002 Paris et al.
6,481,019 B2 11/2002 Diaz et al.
6,513,168 B2 2/2003 Paris et al.
6,513,186 B1 2/2003 Zimmer
6,622,311 B2 9/2003 Diaz et al.
6,711,748 B2 3/2004 Paris et al.
6,751,807 B2 6/2004 Klotz et al.
6,874,170 B1 4/2005 Aaron
6,973,677 B2 12/2005 Diaz et al.
6,990,691 B2 1/2006 Klotz et al.
7,120,941 B2 10/2006 Glaser
7,200,873 B2 4/2007 Klotz et al.
7,608,052 B1 10/2009 Baker
7,735,156 B2 6/2010 Van Der Woude et al.
7,752,682 B2 7/2010 Van Der Woude et al.
7,937,775 B2 5/2011 Manzella, Jr. et al.
7,937,779 B2 5/2011 Klotz et al.
8,020,552 B2 9/2011 Dillon et al.
8,234,722 B2 8/2012 Van Der Woude et al.
8,282,234 B2 10/2012 Van Der Woude et al.
8,291,521 B2 10/2012 Mazzarolo
8,393,017 B2 3/2013 Sheren
2002/0134381 A1 9/2002 Bonhomme et al.
2003/0058100 A1 3/2003 Jumpertz
2005/0109337 A1 5/2005 Diaz et al.
2006/0213523 A1 9/2006 Van Der Woude et al.
2007/0028372 A1 2/2007 Van Der Woude et al.
2007/0050898 A1 3/2007 Larson et al.
2007/0089221 A1 4/2007 Manzella et al.
2007/0138415 A1 6/2007 Rees
2007/0151002 A1 7/2007 Klotz et al.
2008/0202509 A1 8/2008 Dillon et al.
2008/0287899 A1 11/2008 Morrell-Schwartz et al.
2009/0151054 A1 6/2009 Van Der Woude et al.
2009/0184269 A1 7/2009 Rees
2010/0107320 A1 5/2010 Rees
2010/0168705 A1 7/2010 Stabelfeldt et al.
2010/0229290 A1 9/2010 Nelson
2011/0004979 A1 1/2011 Van Der Woude et al.
2011/0098668 A1 4/2011 Thorson et al.

(56) References Cited

U.S. PATENT DOCUMENTS

| | | | |
|---|---|---|---|
| 2011/0145978 A1 | 6/2011 | Harbin | |
| 2011/0226240 A1 | 9/2011 | Navalesi et al. | |
| 2011/0289954 A1 | 12/2011 | Zhang et al. | |
| 2012/0235092 A1 | 9/2012 | Sekimura et al. | |
| 2013/0036538 A1 | 2/2013 | Sheren | |
| 2013/0042861 A1 | 2/2013 | Baek | |
| 2013/0205480 A1 | 8/2013 | Nagely | |
| 2017/0113075 A1 * | 4/2017 | Reiser | A62B 9/04 |

FOREIGN PATENT DOCUMENTS

| | | | | |
|---|---|---|---|---|
| GB | 1007197 | A | 10/1965 | |
| GB | 1395099 | A | 5/1975 | |
| WO | 2012129396 | A1 | 9/2012 | |
| WO | WO-2014031671 | A1 * | 2/2014 | A42B 3/286 |

OTHER PUBLICATIONS

Partial European Search Report; European Patent Application No. EP13196334, Czajka, Francis A., et al, Mar. 17, 2014.

European Search Report; European Patent Application No. EP17155071, Medline Industries, Inc. (Czajka, et al), dated May 31, 2017.

* cited by examiner

PROTECTIVE APPAREL AND SUPPORT APPARATUS AND METHOD OF USE

RELATED APPLICATION

This application is a continuation of U.S. patent application Ser. No. 18/101,946 filed on Jan. 26, 2023, issued as U.S. Pat. No. 12,063,991, and entitled "PROTECTIVE APPAREL AND SUPPORT APPARATUS AND METHOD OF USE," which is a continuation of U.S. patent application Ser. No. 17/369,845 filed on Jul. 7, 2021, issued as U.S. Pat. No. 11,564,427 on Jan. 31, 2023, which is a continuation of U.S. patent application Ser. No. 16/653,621 filed on Oct. 15, 2019 and issued as U.S. Pat. No. 11,083,232 on Aug. 10, 2021, which is a continuation of U.S. patent application Ser. No. 15/850,176 filed on Dec. 21, 2017 and issued as U.S. Pat. No. 10,448,685 on Oct. 22, 2019, which is a continuation-in-part of U.S. patent application Ser. No. 15/284,943 filed on Oct. 4, 2016, and issued as U.S. Pat. No. 9,854,858 on Jan. 2, 2018, which is a divisional of U.S. patent application Ser. No. 13/709,783 filed on Dec. 10, 2012 and issued as U.S. Pat. No. 9,480,290 on Nov. 1, 2016, which is a continuation-in-part of U.S. patent application Ser. No. 13/427,475 filed on Mar. 22, 2012 and issued as U.S. Pat. No. 8,950,017 on Feb. 10, 2015, which claims priority to and the benefit of U.S. Provisional Application No. 61/466,334 filed on Mar. 22, 2011. The content of each these applications is herein incorporated by reference in its entirety.

FIELD OF THE DISCLOSURE

The present disclosure relates generally to protective garments and garment support systems and more particularly body mounted apparatus to support protective apparel.

BACKGROUND OF THE DISCLOSURE

Protective apparel may be worn by surgeons and other care givers or other medical personnel in order to protect patients from infection. Orthopedic procedures and particularly those involving exposed bone are very susceptible to infection and osteomyelitis. Therefore protective apparel may be used to create a sterile field, typically achieved by a gown, often referred to as a "toga" that provides a barrier between the healthcare professionals and the patient.

In some cases, helmets may be worn on the head of the surgical staff supporting the protective apparel. The helmets however can be heavy and can result in a high center of gravity as they extend upwards from the head, resulting in discomfort and an un-ergonomic fit. This can lead to undue neck and back strain on the surgeon. Further, a face shield and an apparel drape can add weight and drag to a helmet. Protective apparel including a helmet, face shield, and apparel drape often restricting movement of the wearer's head due to the added weight and drag.

Further, the face shield may result in a limited field of vision. Additionally, as a result of the contours and nature of the helmet alignment above the head, the face shield may sit close to the wearer's face and may create an uncomfortable and claustrophobic feel. Face shield size may be limited by the outer contours of the helmet. Extending portions of the face shield and/or protective apparel that hang off of the helmet may cause further drag and undue strain.

Some solutions incorporate a chin bar on the helmet that couples to portions of the apparel; however this may further limit the field of vision of the surgeon, and may add more weight to the helmet. Typically patients are positioned below the surgeon's head and may be positioned such that the chin bar obstructs the surgeon's view of the patient.

The protective apparel may enclose the wearer's head and may trap in air exhausted by the wearer. Fans have been incorporated into the helmet and positioned on top of the user's head, and may add even more weight to the helmet further exacerbating the weight and center of gravity issues described above. The fan may draw air in through the gown material and may result in increased current drain on the fan. This may result in reduced battery life or an increased size of the power source to effectively transport air into the interior space of the protective suit.

In some cases the power source must be carried off-helmet in order to incorporate enough energy to power the fan. In such case, a cable may run from the helmet to the power source, typically on a belt, and may restricting the wearer's movement, may rub against the wearer and/or may become unplugged during a procedure, such as a surgery. These fans may further prevent effective air circulation as they may merely force air into the enclosed area around the wearer's head.

Further, donning procedures may be important in maintaining the sterile field about the wearer. Current helmet systems may be cumbersome and may include unnecessary steps to don the system while maintaining sterility.

Thus, there is a need for a protective apparel support apparatus that is light weight, ergonomically configured and improves the wearer's environment.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
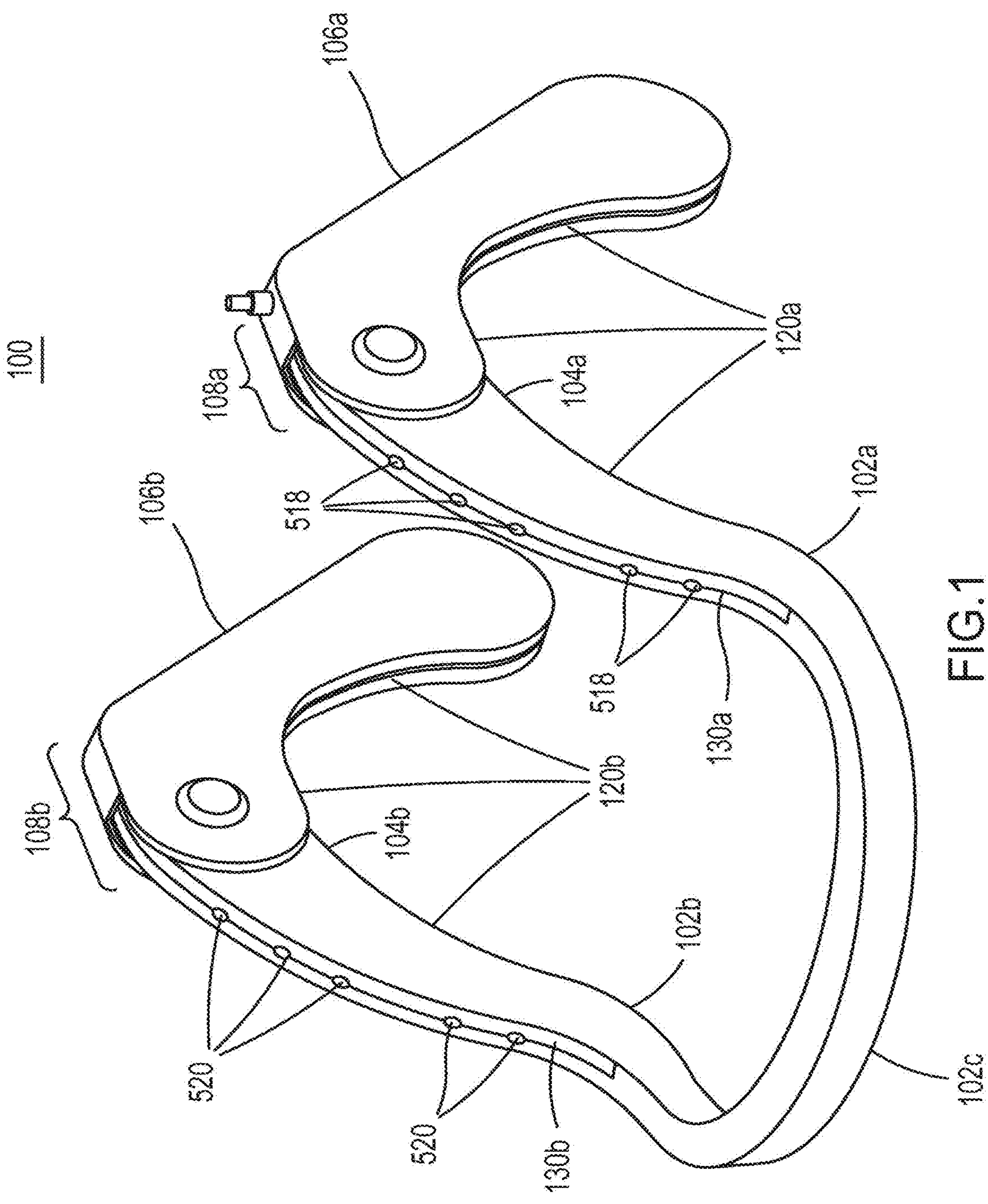
FIG. 1 is a perspective view of an embodiment of a support yoke of the invention.

Before describing in detail embodiments that are in accordance with the present invention, it should be observed that the embodiments reside primarily in combinations of apparatus components and method steps for a protective apparel and support system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In describing the embodiments herein in detail and referring to the drawings, like numbers indicate like parts throughout the figures. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. While some embodiments described herein reference a user or wearer, specifically a surgeon, embodiments of a protective apparel and support apparatus can be used by any user and/or wearer, for example, surgeons and/or other doctors, scientists, students, or any other user that can use protective apparel. In this manner, while some embodiments described herein can reference a patient, in other embodiments, the wearer may be working on, for example, an experiment, a hazardous material, or any other object and/or situation that may prefer protective apparel.

Some embodiments described herein provide a protective apparel and support apparatus that provides a number of advantages, including but not limited to a more comfortable fit by offering a lower center of gravity, improved ergonomic design, a wider stance for improved field of vision, and an effective energy efficient airflow system. In such embodiment, the protective apparel and support apparatus ("apparatus") can be supported by a off of the head of a user. In such embodiments a contoured yoke support structure ("yoke") can rest upon the torso of a user, for example portions of the waist, back, shoulders and chest of a user.

In embodiments, of the invention, the yoke of the protective apparel and support apparatus can be substantially free from contact with the wearer's head. The yoke support structure can include a frame that can be shaped to fit a user's shoulders and shaped to carry and support portions of the protective apparel. The frame can carry portions of the protective apparel which may include a transparent vision shield (e.g., a face shield or shield), barrier material such as a gown, interior air replenishment devices (e.g. a fan), and can distribute the weight of the protective apparel and support apparatus about the torso of the wearer. This can provide the wearer with a comfortable, protective apparel and support apparatus that has a low center of gravity, that may not rest on the wearer's, head and that may provide an ergonomic support to improve wearability.

In some embodiments, the yoke can include a first support portion that can be configured to rest at least partially on a first shoulder of a wearer and a second support portion that can be configured to rest at least partially on a second shoulder of the wearer. Protective apparel can be coupled to the first support portion and the second support portion of the yoke support structure, and can be configured to include a vision shield in front of the wearer's face for viewing and a protective barrier over the wearer.

In some embodiments, an air circulation system can be configured to be coupled to the yoke, and can be configured to provide air replenishment and air conditioning. The air circulation system can include a first fan and a second fan. The first fan can be configured to draw air into or out of the interior of a barrier space and the second fan can be configured to draw air into or out of an interior barrier space. The first fan and the second fan can be disposed away from the wearer's ears and can reduce noise generated by the fans. The yoke can include one or more hollow chambers configured to communicate air within the yoke. In some embodiments, the first fan and the second fan can be disposed within, or coupled to a yoke support structure portion that can extend down the back of the wearer. In some embodiments, a single fan may be used to draw air out of the interior barrier space or to introduce outside air into the interior barrier space.

In some embodiments, an intake fan can be configured to direct air through a yoke portion and out of a front of the yoke in a direction substantially parallel to the wearer's vision, which in some embodiments can be toward the vision shield. This can reduce an amount of air blown directly onto the wearer's face. In such an embodiment, the air may be directed around a curvature of the vision shield in front of the wear's face and to another side of the yoke. One or more inlet ports on the other side of the yoke can be directed to an exhaust fan that can create negative pressure that can result in drawing the air out of the interior of the barrier space.

In some embodiments, the vision shield has a surface area, i.e. a field of vision, of at least 72 inches square and preferably one to four times greater than 72 inches square. A lateral distance between the first yoke portion and the second yoke portion provides for a greater field of vision as the vision shield spans from the first yoke portion to the second yoke portion while the first yoke portion and the second yoke portion are supported by the wearer's shoulders.

In other embodiments, the support apparatus couples to a harness including a waist belt and shoulder straps. The waist belt and shoulder straps may be stand alone or incorporate into wearable garments. In other embodiment, the support apparatus coupled to a torso securement device such as a jacket, vest, a shirt, etc.

FIGS. 1-32 depict various embodiments of protective apparel and support apparatus and/or portions of apparatus. An apparatus can include a yoke, one or more gowns, togas, and/or hoods (single piece and/or multi-piece), and/or a securement device, etc. While each embodiment can be described as including certain element or features, it is understood that non-mutually exclusive elements and features of any embodiment can be included in any other embodiment.

FIG. 1 depicts a yoke support structure ("yoke") 100 of a protective apparel and support apparatus according to an embodiment. The yoke 100 is a support structure that can be configured to rest on the shoulders and upper torso region of a wearer (not shown in FIG. 1). The yoke 100 includes a first chest member 102*a*, a second chest member 102*b* and a lateral chest member 102*c*. The yoke 100 further includes a first back member 106*a* coupled to the first chest member 102*a*, and a second back member 106*b* coupled to the second chest member 102*b*. The yoke 100 can be configured such that the inner contours 120*a, b* of the yoke 100 can substantially rest on the shoulders of the wearer and can substantially rest adjacent to portions of the chest and back of the wearer. The yoke 100 can be configured to rest securely on the upper torso of the wearer and can be configured to support portions of the protective apparel (not shown). The first chest member 102*a* and the first back member 106*a* form the first shoulder portion 104*a*. The second chest member 102*b* and the second back member 106*b* form the second shoulder portion 104*b*.

Figure 1A:
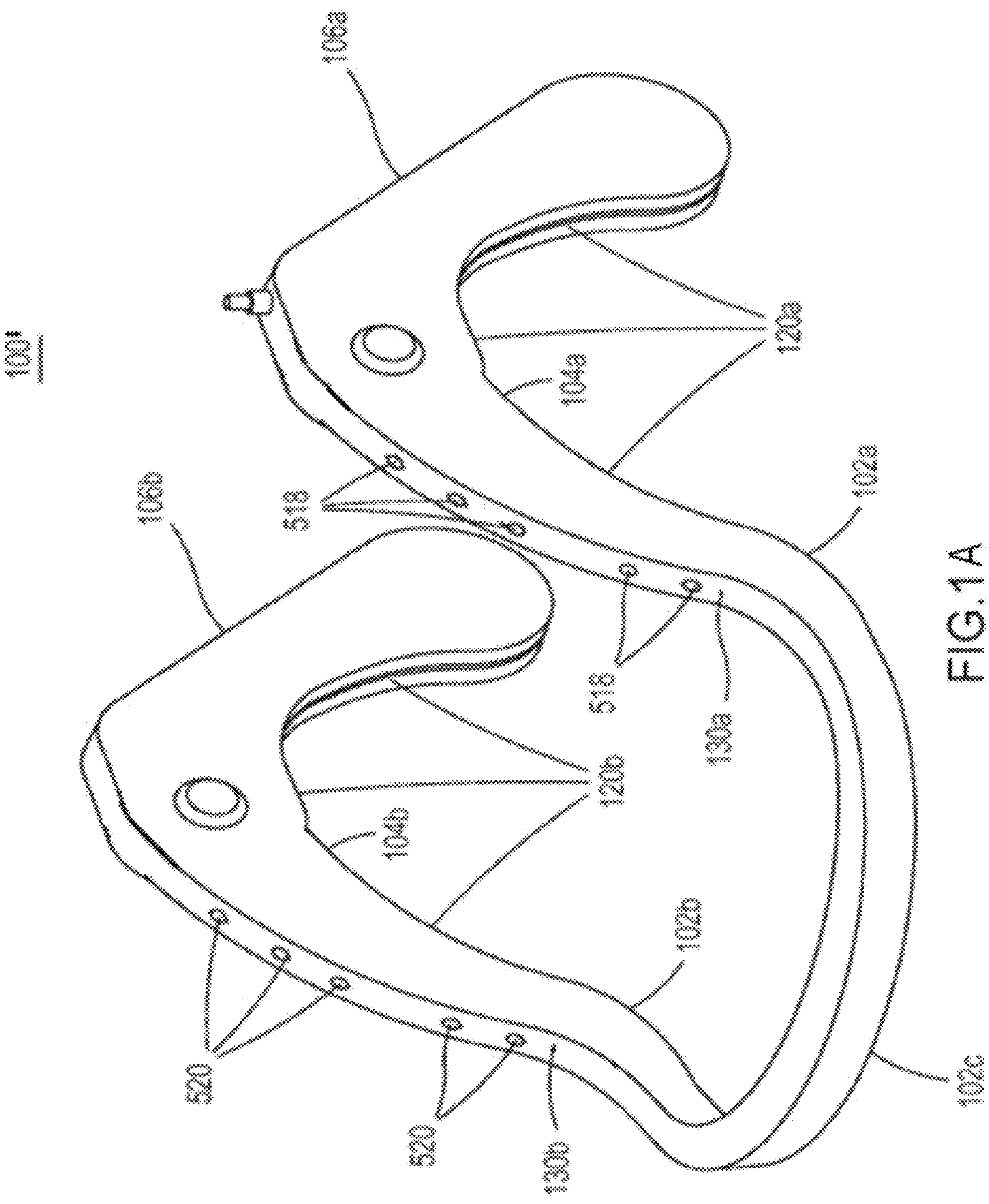
FIG. 1A is a perspective view of an alternative embodiment of the support yoke of FIG. 1.

In this embodiment the first back member 106*a* is hingedly coupled to the first chest member 102*a* with a first hinge 108*a*; and the second back member 106*b* is hingedly coupled to the second chest member 102*b* with a second hinge 108*b*. The first hinge 108*a* and the second hinge 108*b* can allow the yoke 100 to adjust to the size of the wearer by pivoting the chest member and the back member relative to one another about hinges 108*a*, 108*b*, to change the shoulder opening size of yoke 100. This can accommodate difference in torso thickness from one wearer to another wearer while still allowing the yoke 100 to wrap over the shoulders. In alternative embodiments, as illustrated in FIG. 1A, the yoke 100' is a unitary structure and may be flexible such that yoke material bends, and can allow the yoke to be "form-fit" to the wearer by bending the unitary structure. In further alternatives, all or portions of the yoke may comprise a deformable material. The deformable material may be positioned such that it deforms to accommodate the wearer while the overall yoke maintains its general shape. For example, in certain embodiments, first and second shoulder portions 104*a*, 104*b* may be formed, at least in part, from a deformable material that allows the shoulder portions to form to the wearer. Any appropriate deformable material may be used, whether plastically or elastically deformable, including but not limited to open cell foam, closed cell foam, memory foam, plastics, elastomers, polyurethane and the like. Other embodiments may incorporate a plurality of members, while some or all may be flexible or some or all may be at least semi-rigid, or a combination thereof. For example, a portion of the yoke may be a formable wire frame and another portion may be a plastic support portion.

The yoke 100 can be configured to rest on the wearer's shoulder at the first shoulder portion 104*a* and at the second shoulder portion 104*b*. In this embodiment the chest members 102*a*, 102*b* connect across the chest of the wearer with the lateral chest member 102*c*. In other the chest members 102*a*, 102*b* can rest on the chest without interconnecting the first and second chest members 102*a*, 102*b*. The yoke 100 can also partially rest on the chest in varying degrees with the chest members 102*a-c*.

Figure 2:
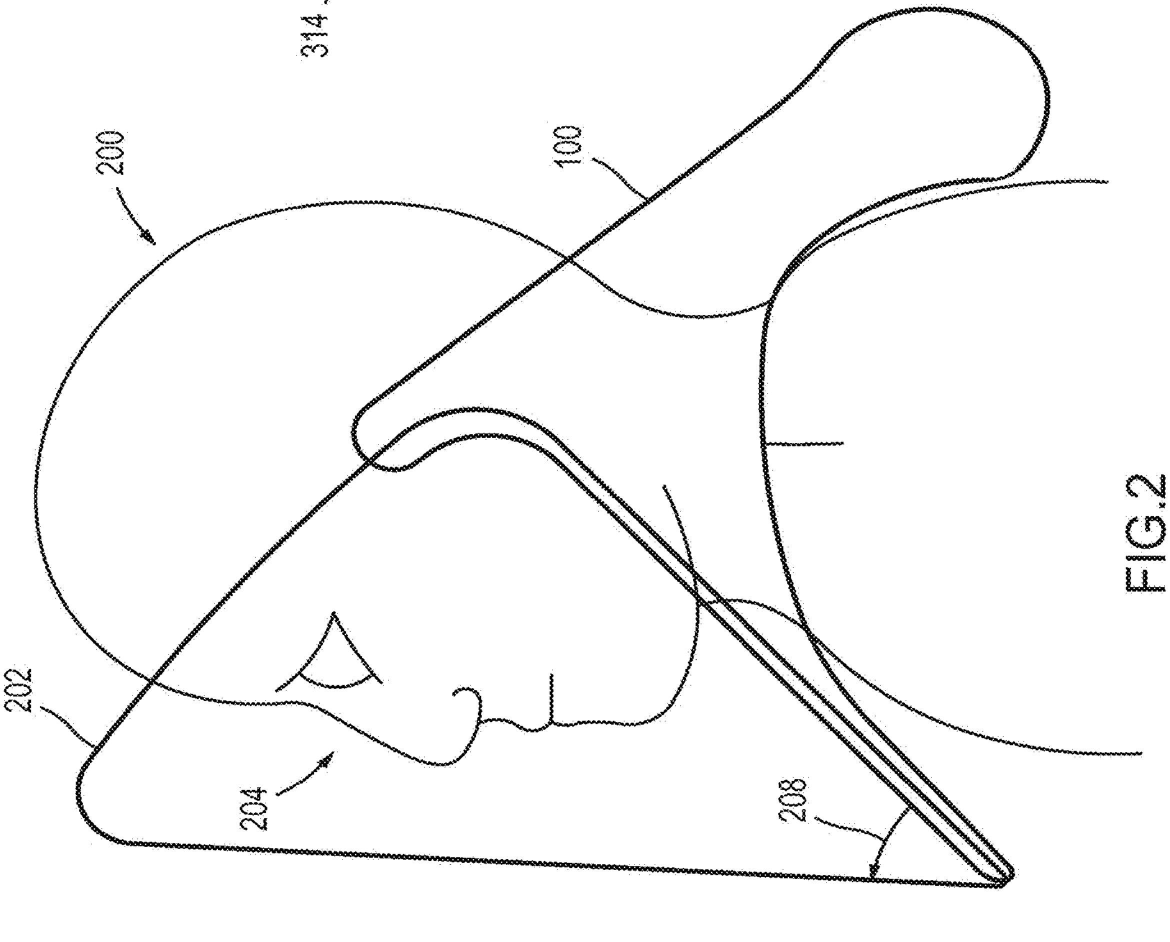
FIG. 2 is a side view of an embodiment of a yoke donned by a wearer of the invention.

FIG. 2 is a side view of a yoke 100 shown positioned on a wearer 200. The yoke 100 is positioned on the wearer 200's shoulders and include a substantially transparent vision shield 202 positioned in front of the wearer 200's face 204. The vision shield 202 can be configured to maintain barrier protection of the protective apparel while allowing the wearer 200 to see the patient. The weight of the vision shield 202 can be supported by the yoke 100 and can be distributed onto the shoulders 206 and can transfer the weight of the vision shield 202 to the wearer. The vision shield 202 position relative to the wearer's face 204 can be a function of a standoff distance (not shown) of the vision shield 202 from the chest members 102*a-c* and an angle 208 of a tilt away from the yoke 100 and the wearer. Having the vision shield 202 coupled to the yoke 100 can offset the vision shield 202 a distance from the wearer's face.

The first back member 106*a* and the second back member 106*b* can act as counter weight configured to counteract a moment of force on the front of the yoke 100 due to the weight of the vision shield 202, a protective garment 302 (see, e.g., FIG. 3), and the front portion of the yoke 100. Balancing the yoke 100 minimizes movement of the yoke 100 relative to the wearer 200. A length and a weight of the back members 106*a*, 106*b* in conjunction with a weight of one or more batteries (not shown) and an air circulation system (not shown) can be configured to counter balance the moment of force on the front chest member 102*a-c*. While some of the force on the front of the yoke 100 can be imparted from the chest member's 102*a-c* on to the wearer's chest, the counter weight effect of the back members 106*a*, 106*b* can counter act the amount of force on the wearer's chest and can distribute the weight about the wearer's shoulders. The yoke 100 can cradle the wearer's torso to minimize movement of the yoke 100 as it is worn.

As shown in FIGS. 1-4, the yoke 100 can include a downward u-shape that can lower the center of gravity of the overall protective apparel and support apparatus (not shown) as it sits over the shoulders of the wearer, distributing the weight to stabilize the apparatus. Although it is preferred that movement of the protective apparel and support apparatus is minimized, some movement of the apparatus relative to the wearer may be acceptable. In such embodiments, the vision shield 202 can be sized such that some movement does not hinder the wearer's line of sight.

Figure 3:
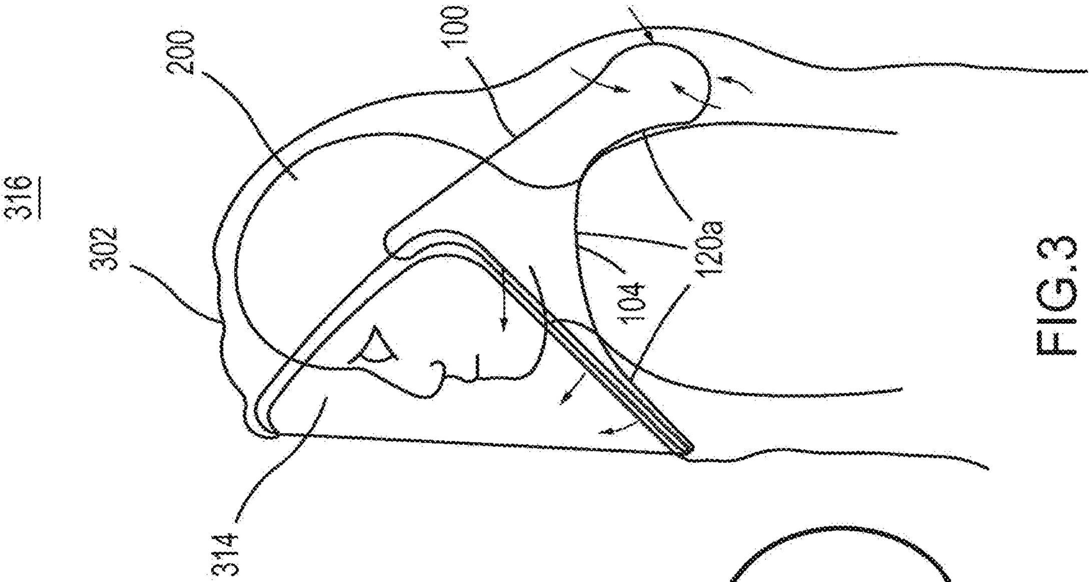
FIG. 3 is a side view of an embodiment of a yoke donned by a wearer of the invention.

FIG. 3 is a side view of the yoke 100 shown positioned on a wearer 200 and includes the vision shield 202 and a protective garment 302. The protective garment 302 can be coupled to the yoke 100, the vision shield 202 and/or a combination thereof. In this embodiment the protective garment 302 is coupled to the vision shield 202. The vision shield 202 can be selectively coupled to the yoke and can be coupled to the yoke after the yoke is fitted on the wearer. In other embodiments, the vision shield 202 can be coupled to the yoke prior to the yoke being fitted to the wearer. The protective garment 302 can be, for example, a hood, a body toga, a gown, an upper torso gown, combinations of said protective garments, and/or the like. The protective garment 302 is positioned between the patient and the surgeon or care giver. The protective garment 302 and the vision shield 202 can be configured to form an interior barrier space 314. The interior barrier space 314 is generally the space between the protective garment 302 and the wearer. The wearer's head and at least portions of the upper body of the wearer are contained within the interior barrier space 314. The interior barrier space 314 is separated from an exterior 316 of the system.

Figure 4:
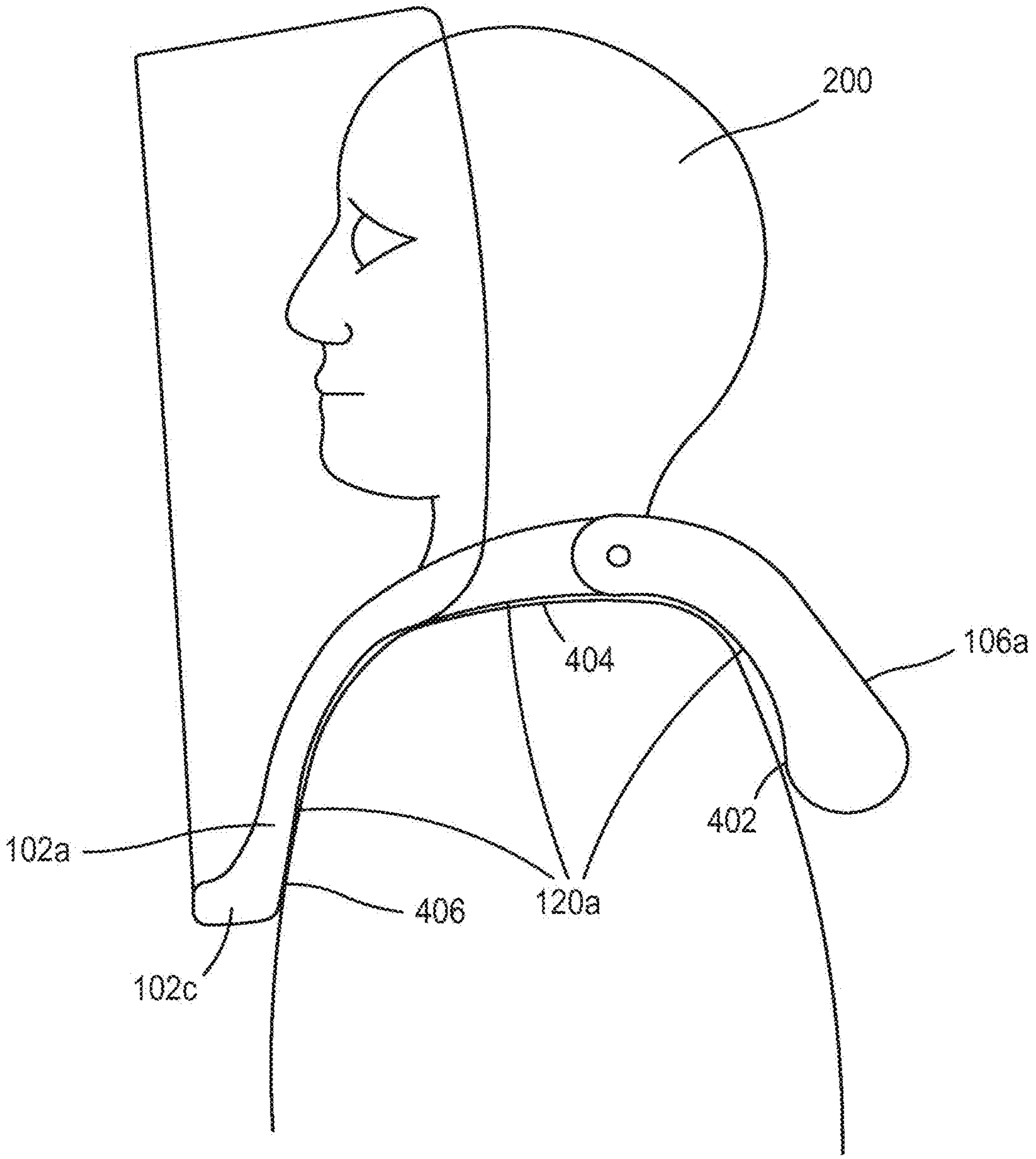
FIG. 4 is a side view of an embodiment of a yoke donned by a wearer of the invention.

FIG. 4 is a side view of the yoke 100 as it rests on the wearer's torso, showing the conforming fit of the yoke 100 to the wearer's upper torso according to another embodiment. The back members 106*a-b* rest on a back portion 402 of the wearer's torso, the shoulder portions 104*a-b*, rest at least on the top of the wearer's shoulders and the chest members 102*a-c* rest on a front portion of the wearer's shoulders and the chest of the wearer's torso. The first hinge 108*a* can be configured to couple the first back member 106*a* and first chest member 102*a* and can allow rotation of the first back member 106*a* relative to the first chest member 102*a* and can change the shape of the yoke 100 (the distance between the first chest member 102*a* and the first back member 106*a*) to conform more closely to the wearer's torso size and shape.

Figure 5:
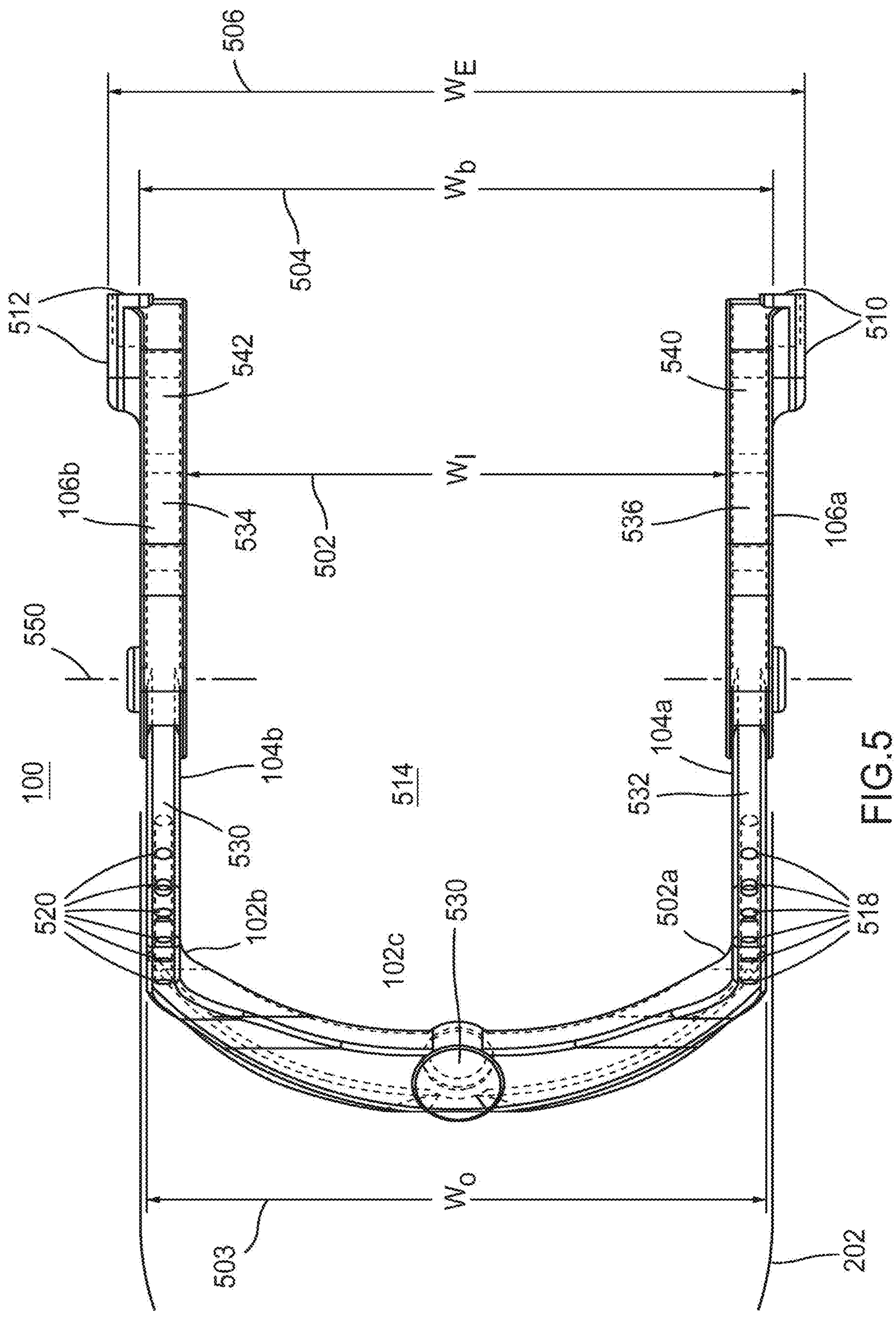
FIG. 5 is a top view of an embodiment of a yoke of the invention.

FIG. 5 is a top view of a yoke 100. In this embodiment the chest members 102*a-c* and the back members 106*a-b* have internal chambers, a first chest member chamber 530, a second chest member chamber 532, a first back member chamber 534 and a second back member chamber 536 ("chambers 532-536"). FIG. 5 further illustrates dimensions of the yoke 100.

The overall width of the yoke 100 can provide a support that is generally wider than the wearer's head which can allow for donning of the yoke 100 and the accompanying protective apparel (not shown). A first inside dimension of the yoke WI, 502 measured at the rear of the yoke between the first back member 106*a* and the second back member 106*b* can be greater than 7.0 inches and preferably can be greater than 9.0 inches. A first outside dimension $W_o$, 503 measured at the outer most dimension of the front portion of the yoke 100 between an outside of the first chest member 102*a* and an outside of the second chest member 102*b*. The first outside dimension $W_o$ can affect the distance the vision shield 202 is positioned relative to the wearer once the yoke 100 is donned. The wider the yoke 100 ($W_o$), the wider the vision shield 202 and subsequently, the greater the field of vision, as well as the greater the distance the shield 202 will be offset from the wearer's face.

Yoke 100, as shown in FIG. 5, further includes air transport ports, specifically, a first air port 510 and a second air port 512. The first air port 510 and the second air port 512 are configured to allow air to be communicated between the interior barrier space 514 (or similarly as interior barrier space 314) of the system to the outside of the barrier. In this manner, air within the interior barrier space 514 can be replenished. In some embodiments one or more fans can be used for air circulation and/or replenishment. In this embodiment, a first fan 540 (shown in broken line) draws air into the interior barrier space 514 through the first external air port 510 while a second fan 542 (shown in broken line) exhausts air from the interior barrier space 514 through the second air port 512. The air that enters through the first air port 510 is communicated through the chambers 532-536 and then introduced to the interior barrier space 514 by at least one inlet ports 518. After flowing through the interior barrier space 514, the air that enters the yoke 100 through one or more outlets 520, travels through the one or more other of chambers 532-536 and is exhausted from the yoke 100 by the second blower fan 542 through the second external port 512.

The inlet port 518 may be formed in any of the chest members 102*a*, 102*b*, 102*c*. As shown in FIG. 5, yoke 100 includes more than one inlet port 518; specifically, first chest member 102*a* can include a set of inlet ports 518, and second chest member 102*b* can include a set of outlet ports 520. While shown in FIG. 5 as including a certain shape and/or location, in some embodiments, the shape and/or location of the one or more inlet and outlet ports can vary. For example the one or more ports may be one or more slots in the yoke 100.

In this embodiment the inlet ports 518 can introduce air into the interior barrier space 514 from first air port 510, while the outlet ports 520 can remove air that can be exhausted from the second air port 512. This is in effect a push/pull system wherein air is introduced (pushed) into the interior barrier space 514 by the first air port 510, a first fan (shown later) and the inlet ports 518 and exhausted (pulled) through the second set if internal ports 520, a second fan (shown later) and the second external port 512. In this embodiment the air may be directed from the inlet ports 518 toward the vision shield 202 and drawn across the shield into the outlet ports 520, thereby replenishing the air in the interior barrier space 514. It is also understood by those of ordinary skill in the art that ports may be placed throughout the yoke. The ports may also be directed at the wearer or directed away from the wearer. Alternatively, various ports may be directed in different directions.

As described herein, a protective apparel and support apparatus can define an interior barrier space and a sterile field to substantially separate a wearer, for example a surgeon, from a person or thing, for example a patient. In some embodiments the apparatus includes a one-piece suit that covers the head and the body portions of the wearer. In some embodiments, the apparatus includes multi-piece suits, for example, having a hood portion to cover a wearer's head and/or upper body, and a gown portion to cover a wearer's upper body and lower body. In these embodiments the yoke 100 is placed on the wearer and at least under the head covering portion of the protective apparel. In other embodiments the yoke 100 rests on the wearer under all portions of the protective apparel.

Figure 6:
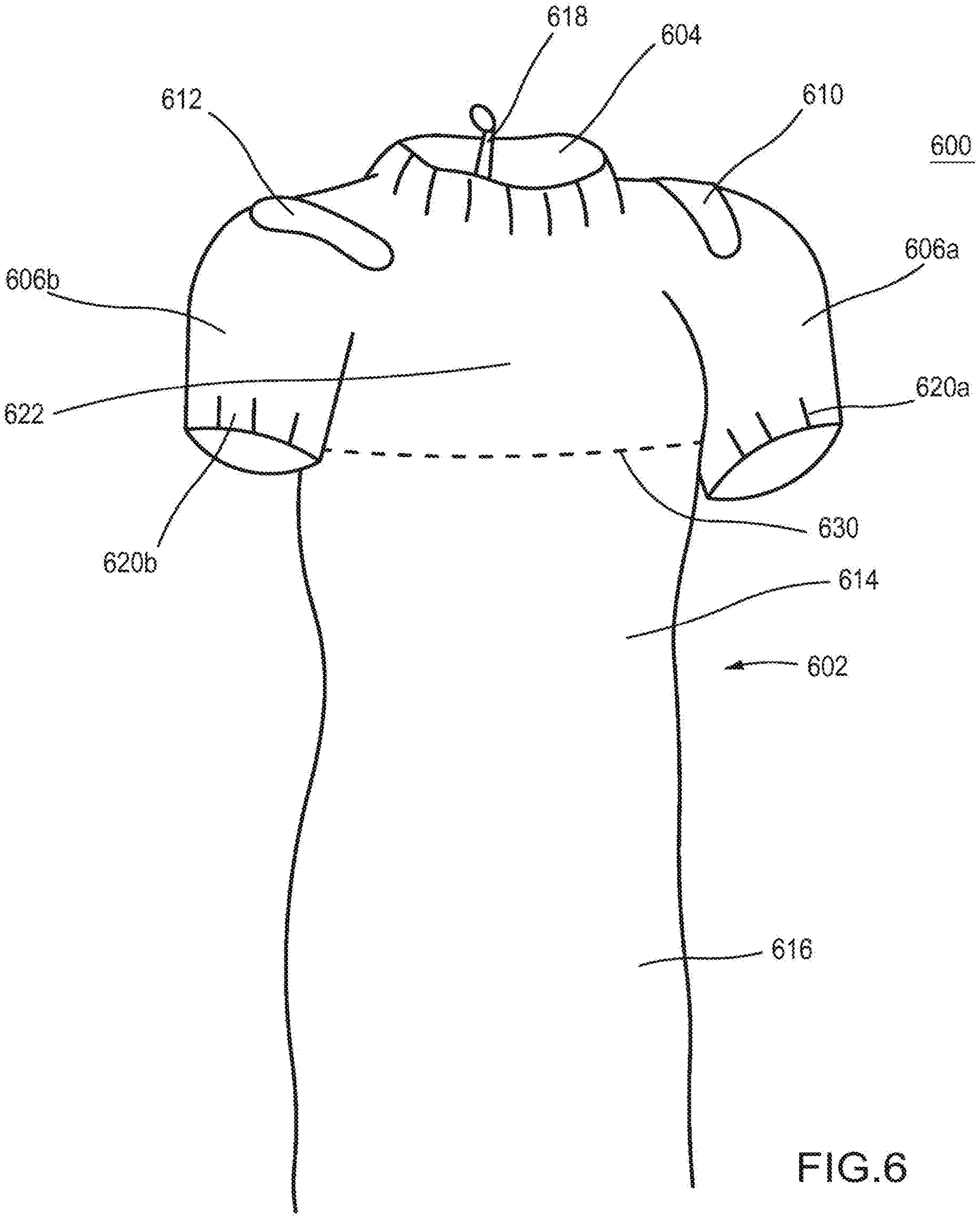
FIG. 6 is a perspective view of an embodiment of a gown of the invention.

FIG. 6 is a perspective view of a protective gown 600 that may form a portion of the invention. The protective gown 600 can include a front 602 and a back (not shown), a neck opening 604, a first sleeve 606*a* and a second sleeve 606*b*.

The protective gown 600 has a chest portion 622, which can be indicated as the portion above the dash line 630. The protective gown 600 includes a first yoke receiving area 610 and a second yoke receiving area 612. The protective gown 600 also includes an abdominal portion 614 and a bottom portion 616. The protective gown may also include a zipper 618. While shown in FIG. 6 as including a zipper 618, in other embodiments, protective gown 600 can include other fastening devices, such as hook and loop fasteners, adhesive or the like when the protective gown 600 is configured to fully encloses the back of the wearer. While the sleeves 606*a*, 606*b* are depicted in FIG. 6 as being short sleeves, in other embodiments, sleeves 606*a*, 606*b* can be long sleeves or, in some embodiments, the gown may not have sleeves at all so long as other protective garment portions provide complimentary protection. In such embodiments, the apparatus can include a second gown portion including sleeves (see, e.g., FIG. 7). Each sleeve 606*a, b* may have an elastic cuff 620*a, b*. The protective gown 600 can be used with a second protective portion (see, e.g., FIG. 7), which may be a hood.

Figure 7:
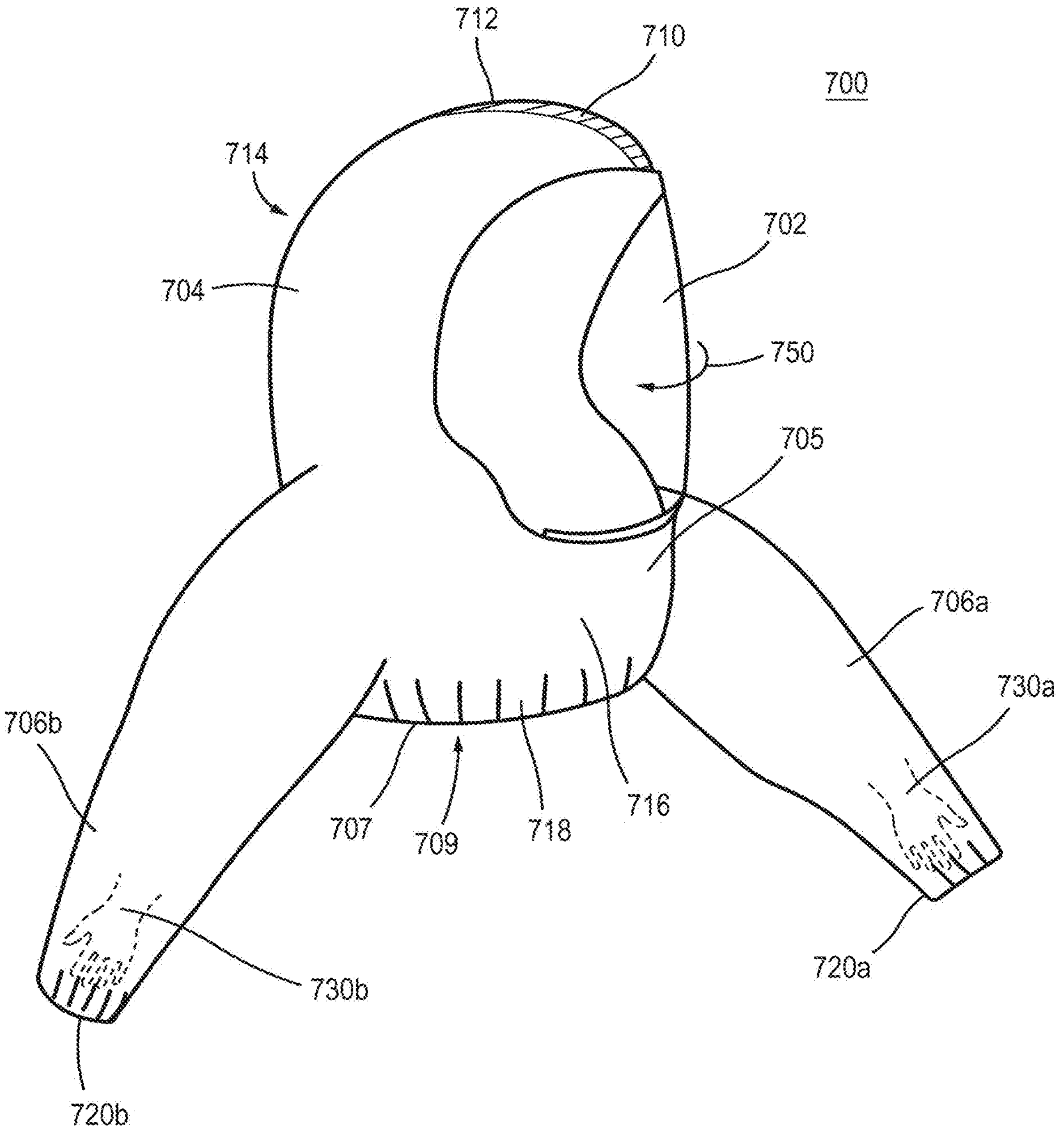
FIG. 7 is a front perspective view of an embodiment of a hood of the invention.

FIG. 7 is a perspective view of a second protective gown portion, specifically, a hood 700. Hood 700 includes a vision shield 702, a head portion 704, a body portion 705 which includes a chest area 716, and a pair of sleeves 706*a, b*. Hood 700 may include a zipper 710 running from the front of the hood to the back over a top 712 of the hood 700 and down a back 714 of the hood 700. Hood 700 can include one or more elastic elements. Specifically, hood 700 includes a chest elastic 718 included around the chest area 716 and can include elastic sleeve cuffs 720*a, b* at least at the end of sleeves 706*a, b*. The first sleeve 706*a* and the second sleeve 706*b* are configured as long sleeves in this embodiment. The chest area 716 has a bottom edge 707 which defines a chest opening 709. While shown in FIG. 7 as including long sleeves, in other embodiments, hood 700 can include no sleeves or short sleeves. In such embodiments, hood 700 can be included in an apparatus having a first gown that includes long sleeves. In this manner, at least one of either the first gown or the hood can includes long sleeves.

The hood 700 can include the same material as the protective gown 600 or it can include different material. For example the hood 700 may be made of a more breathable material than the protective gown 600. The hood 700 may be made of a lighter material than the protective gown 600. In other embodiments, the hood 700 has a different barrier protection level than the protective gown 600, for example, the hood 700 material may have a protection level in accordance with the Association for the Advancement of Medical Instrumentation (AAMI) standards. The material may be different from gown to gown or even within a single gown, the protective gown 600 may be rated at different AAMI standard levels. Different portions of each the hood 700 and the protective gown 600 may have different materials or protection levels as well. In some embodiments, one or both of the protective gown 600 and/or the hood 700 can include woven, non-woven materials, plastics or the like. In some embodiments, materials may be biodegradable, compostable or both.

Figure 8:
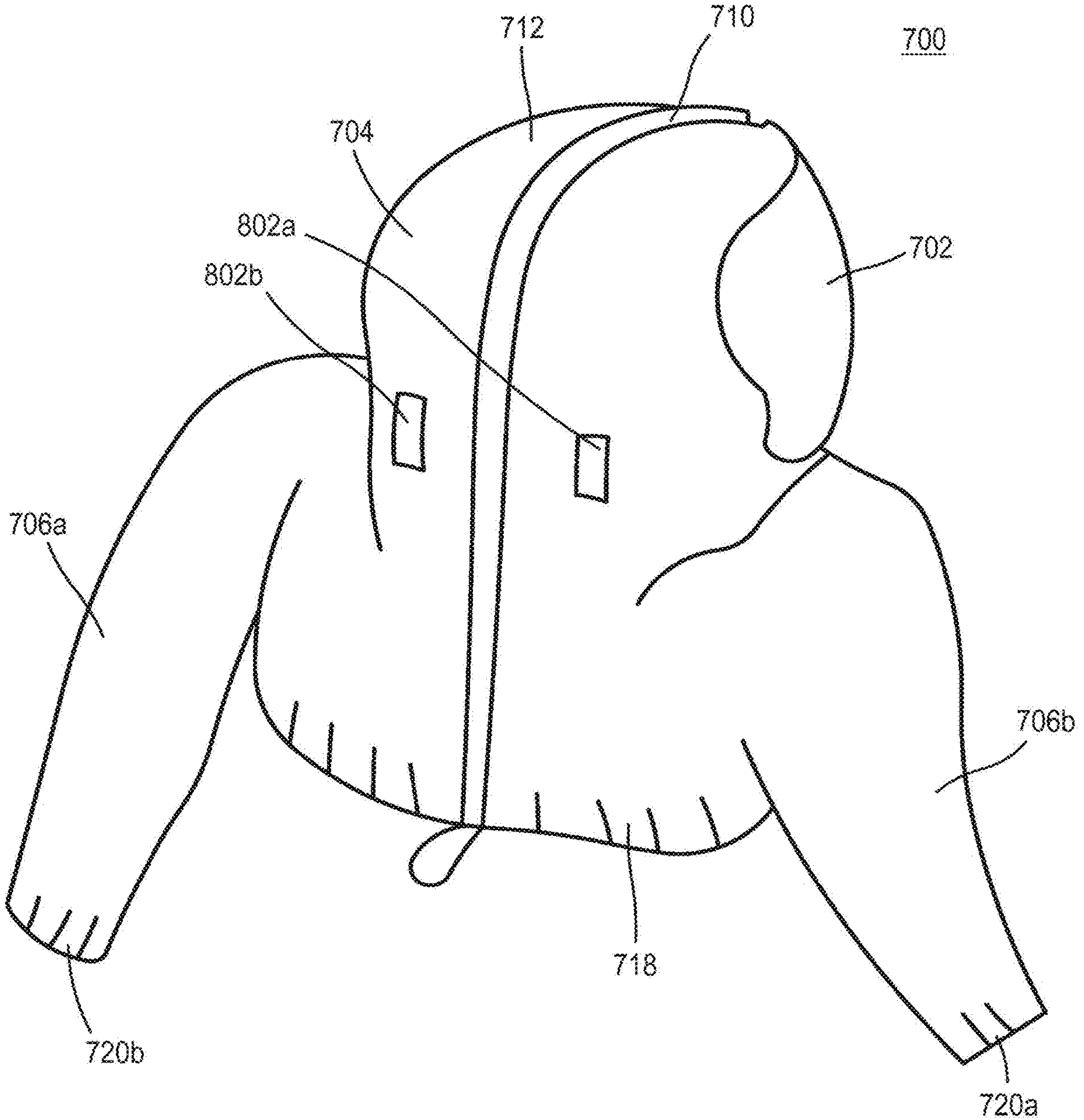
FIG. 8 is a rear perspective view of the hood shown in FIG. 7.

FIG. 8 is a rear perspective view of the hood 700. The hood 700 further includes a first hood port 802*a* which is a void in the hood 700. The hood port 802*a* is configured to substantially align with and be coupled to an air port of a yoke, for example, the first air port 510 of the yoke 100. The hood portion further includes a second hood port 802*b* which is a void in the hood 700. The hood port 802*b* is configured to substantially align and is configured to be coupled to an air port of a yoke, for example, the second air port 512 of the yoke 100. The hood ports 802*a*, 802*b* are formed by voids in the hood material to allow for the flow of air between the interior barrier space and an exterior space. In some embodiments, the flow of air can be induced by the at least one fan of the yoke 100. In some embodiments, one or both of port 802*a*, 802*b* can include a porous covering, for example, a mesh and/or a filter.

As described above, the hood ports 802*a*, 802*b* can be configured to be coupled to a first air port and/or a second air port of a yoke, for example the first air port 510 and the second air port 512 of the yoke 100. In such embodiments, the air ports of the yoke can be configured to be secured to the hood ports 802*a*, 802*b* using hook and loop fasteners or another fastening system. In such embodiments, a first hook or loop portion can be coupled to the hood adjacent the hood port 802*a*, 802*b*, and a second hook or loop portion can be coupled to the yoke 100 adjacent the air port 510, 512. In some embodiments, securing the air ports of the yoke to the hood ports 802*a*, 802*b* can maintain the alignment of the air ports with the hood ports. In another embodiment, the hood port 802*a* may have a size smaller than an outside dimension of the first air port 802*a* of the yoke 100. In this embodiment the hood port 510 is sized large enough to slip over the first air port 510 and may be held in place by a detent (not shown) in the first air port 510. In yet another embodiment, the hood port 802*a* is greater in size relative to the first air port 510 of the yoke 100 such that the hood port generally aligns with the first port 510 when the hood is donned. In some embodiments, an elastic fastener (not shown) can be disposed about one or more of hood ports 510, 512 and can be configured to maintain one of more of hood ports 510, 512 in a closed position.

In an apparatus including the hood 700 and the first gown portion 600, the hood 700 can be donned such that portions of the gown 600 are covered by the hood 700 to complete the sterile field about the wearer. In such embodiments, the sleeves 606*a, b* of the protective gown 600 are overlapped by the sleeves 706*a, b* of the hood 700. The overlap can be configured to maintain the sterile filed. The chest elastic 718 of the hood 700 holds the chest area 716 of the hood 700 tight to the chest portion 622 of the protective gown 600 such that the there is sufficient material overlap to maintain the sterile field. While the hood 700 is shown as including a certain body portion 705 hood 700 length, in other embodiments, the length of the body portion can be shorter, or longer, for example, extending below the chest area for example.

Figure 9:
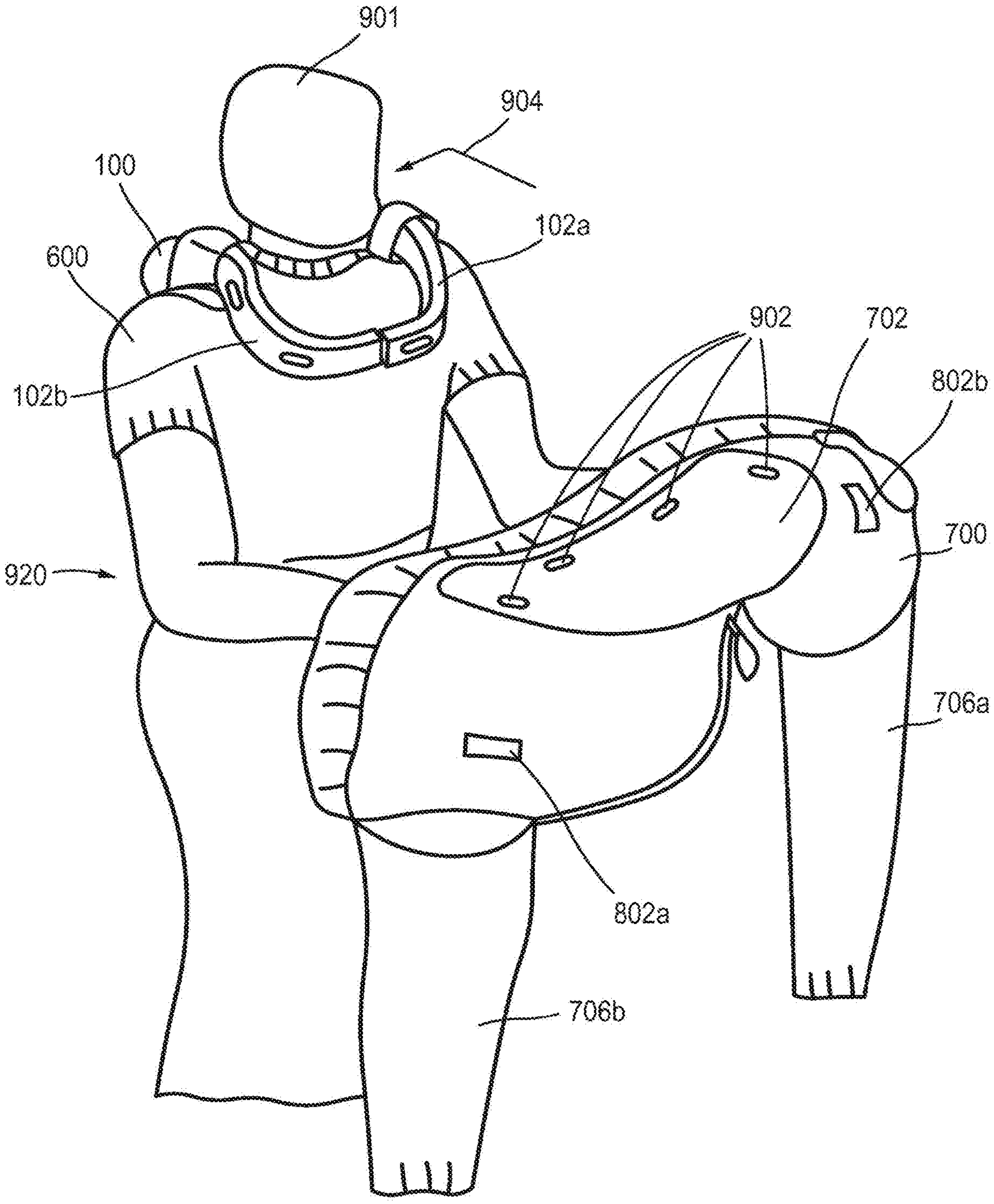
FIG. 9 is a front perspective view of an embodiment of a wearer donning the gown shown in FIG. 6 and the hood shown in FIG. 7.

FIG. 9 illustrates a wearer 901 of an apparatus including the protective gown 600, the yoke 100, and the hood 700. Specifically, FIG. 9 illustrates the wearer 901 with the protective gown 600 on and the yoke 100 placed on the wearer over portions of the protective gown 600, with the hood portion off. The back members 106*a, b* of the yoke 100 are not connected so as to accommodate rear entry donning of the yoke 100 by the wearer 901. The wearer 901 slides the yoke 100, indicated by arrow 904, on from a front side of the wearer 901 and then down onto the shoulders of the wearer 901. The wearer 901, in this illustration, is holding the hood 700 in preparation to don the hood 700 over the yoke 100 and over the gown 600. The hood 700 is shown here in an open position to be donned on the wearer 901 such that sterile filed is maintained. The hood 700 is then closed, by zipping up the hood 700 in this embodiment. The shield 702 has a yoke receiving element 1404 (see e.g., element 1404 in FIG. 14) that includes notches or voids in the shield, adhesive, hook and loop or other securement devices, or a combination thereof. Hook and loop fasteners 902 may be placed at various positions on the shield 702 and the yoke 100 to hold the shield to the yoke 100.

In some embodiments, yoke 100 can be configured to be coupled to a securement device, specifically a body securement device, such as, for example, a harness. In such embodiments, the securement device can be configured to be worn by a wearer and can be mechanically coupled to yoke 100 such that the yoke 100 can be restrained to the wearer.

Figure 10:
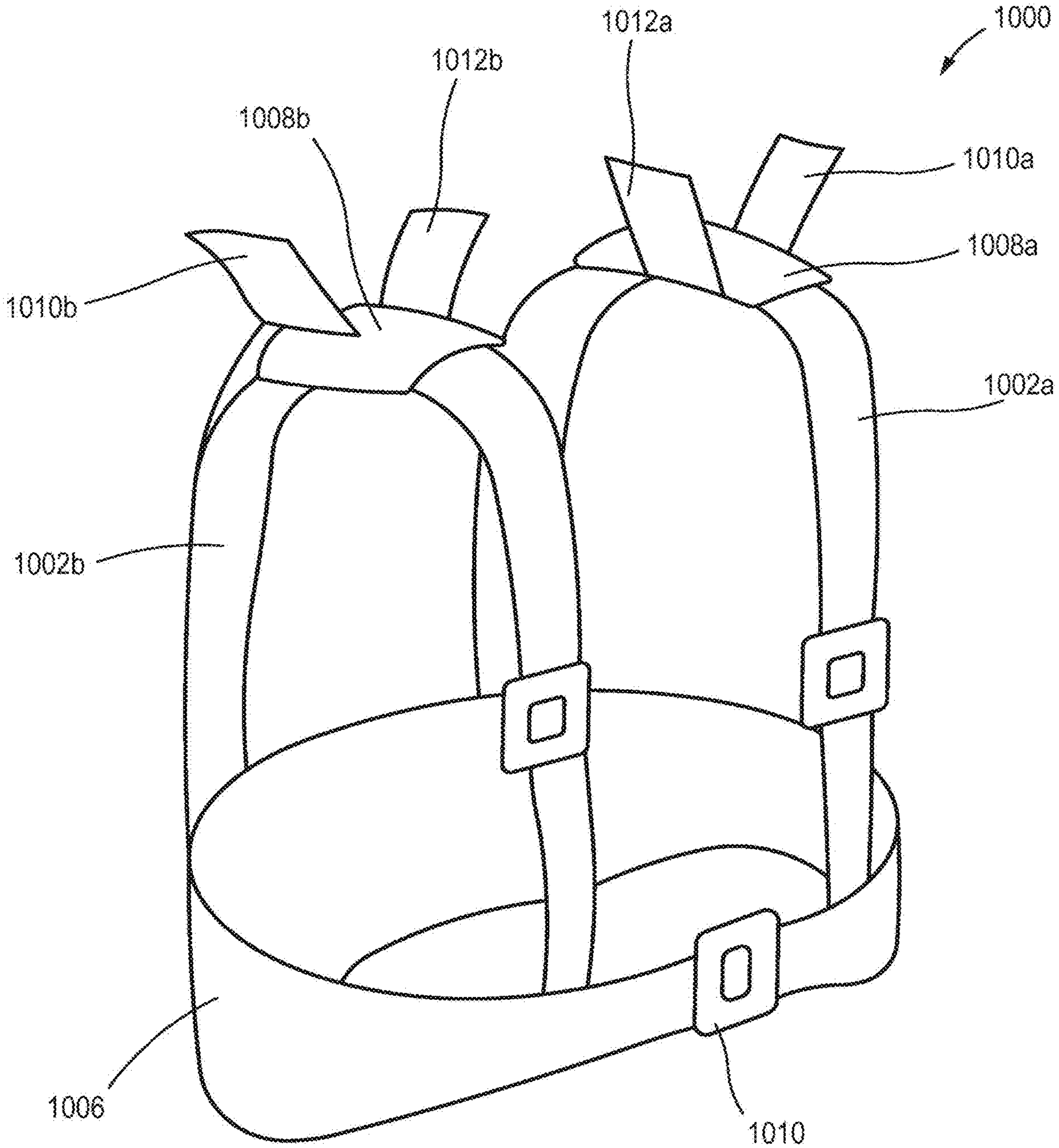
FIG. 10 is a front perspective view of an embodiment of a harness of the invention.

FIG. 10 illustrates a securement device, specifically a harness 1000 configured to be coupled to the yoke 100. Although the configuration of the yoke 100 can allow it to be a stand alone apparatus, the harness 1000 can supplement the yoke 100 as part of the apparatus. In some situations, the harness 1000 may provide improved fit for the wearer. In other embodiments the harness 1000 provides additional ergonomic features. The harness 1000 includes shoulder straps, specifically a first shoulder strap 1002*a*, a second shoulder strap 1002*b*, and a belt 1006. The first shoulder strap 1002*a* includes a first yoke attachment portion 1008*a* and the second shoulder strap 1002*b* includes a second yoke attachment portion 1008*b*. The harness 1000 may be used in conjunction with the yoke 100 and a protective garment as part of a protective apparel and support apparatus. In this embodiment, the belt portion 1006 of the harness 1000 can be configured to provide support for the lower back and abdominal regions of the wearer.

In this embodiment, the yoke attachment portions 1008*a, b* comprise a pair of attachable straps that comprise a first yoke securement strap 1010*a, b* and a second yoke securement strap 1012*a, b* for each shoulder strap 1002*a, b*. The first yoke securement strap 1010*a* and a second yoke securement strap 1012*a* are configured to be selectively coupled to a first side of the yoke 100 and a first yoke securement strap 1010*b* and a second yoke securement strap 1012*b* are configured to be selectively coupled to a second side of the yoke 100.

In this embodiment, the harness 1000 is worn by the wearer and the yoke 100 is placed on to the wearer. The yoke can rest adjacent to at least a portion of the yoke attachment portions 1008*a-b* of the harness 1000. The first yoke securement strap 1010*a* and a second yoke securement strap 1012*a* can be wrapped over the yoke 100 and coupled together by a fastener, which in this embodiment is a hook and loop fastener. At least one of the first and second yoke securement straps 1010*a*, 1012*a* are elastic and can be stretched over the yoke 100 to secure the yoke to the harness 1000. The same applies to the first yoke securement strap 1010*b* and a second yoke securement strap 1012*b* coupling the second side of the yoke 100 to the harness 1000. Once the harness 1000 is coupled to the yoke 100, the protective apparel may be fitted to the yoke and the wearer. In some embodiments, the yoke 100 can be coupled to more than one securement device, such as, for example, a backpack, a vest, a jacket, shirt, scrub or the like generally worn by the user.

Other embodiments and means for coupling the yoke to the harness will be evident to those of ordinary skill in the art. Some embodiments include providing hook and loop fastener on conjoining portions of the yoke and the harness. In this embodiment a first portion of the hook and loop fastener resides on the top of the shoulder strap and aligns with a second complimentary hook and loop fastener portion attached to the underside of the yoke, selectively coupling together when the yoke is placed on the harness 1000.

Figure 11:
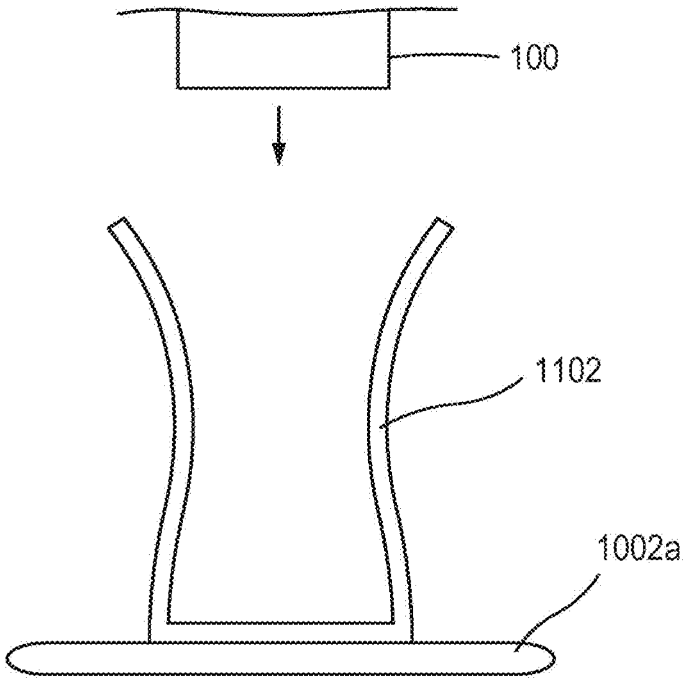
FIG. 11 is an embodiment of a yoke attachment spring bracket of the invention.

In yet another embodiment, the yoke attachment portion is a spring bracket coupled to the shoulder strap of the harness 1000, illustrated in FIG. 11. The spring bracket 1102 is a u-shaped bracket that receives the yoke 100, holding the yoke 100 to the harness 1000 through the frictional forces of the spring. An additionally securement strap may be placed at the top of the u-shape bracket 1102 in some embodiments.

In other embodiments, a yoke can be couple to a harness using, for example, cover snaps, clips, etc. Further, FIG. 10 depicts the yoke being coupled to the harness, other embodiments, the yoke can be coupled to other garments worn by the wearer, for example, a shirt.

Figure 12:
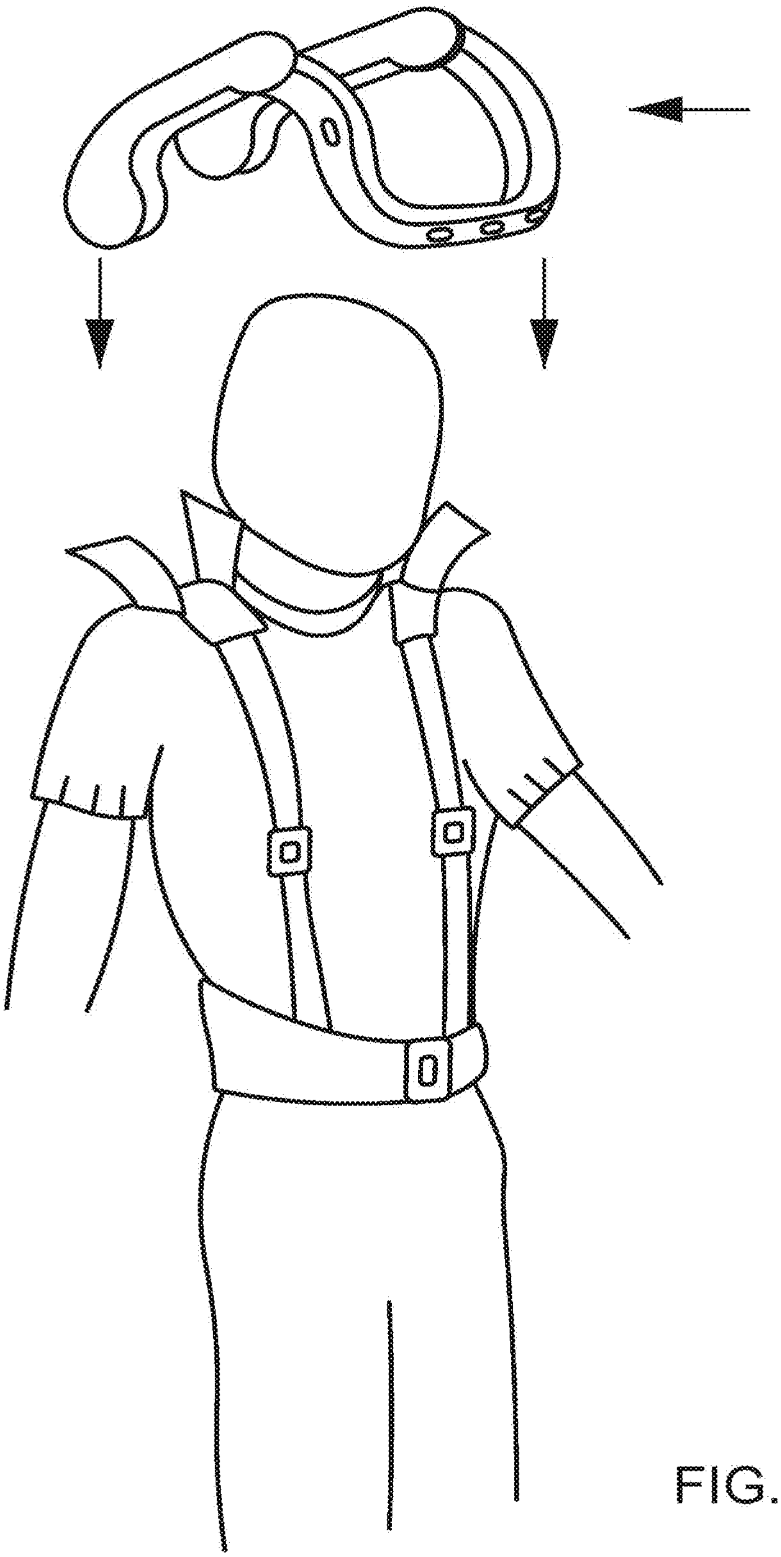
FIG. 12 is a front perspective view of an embodiment of a wearer donning a yoke of the invention.

FIG. 12 is a perspective view of a harness 1000 that is being coupled to the yoke 100 as it is donned on the wearer. Once the yoke 100 is in place, the yoke securement straps can be wrapped over the yoke portions and secured together. Harness 1000 can allow the yoke 100 to be secured to the wearer, and may reduce or eliminate forces and/or stress on the wearer's head, such that a lens (not shown) can include an increased field of vision, and can be spaced apart a distance from the wearer's face, configured to improve comfort and maneuverability. In such an embodiment the yoke 100 can be donned by placing yoke 100 in front of the wearer's chest and neck region and then down onto the shoulders of the wearer. The height of the yoke relative to the wearer is illustrated in FIG. 12. In some embodiments, the yoke can be brought up from in front of the wearer, sliding around the neck and brought to rest on the shoulders of the wearer 1201. In some embodiments, the open yoke configuration is that the yoke need only be raised enough to clear the shoulders during donning; and it may not be necessary to reach over the wearer's head to be donned.

In one embodiment the yoke 100 is held by the chest portions, and moved back and over the shoulders of the wearer and brought to rest on the shoulder. Once resting, the yoke 100 may be secured by the yoke attachment portions 1008*a-b* for example.

Figure 13:
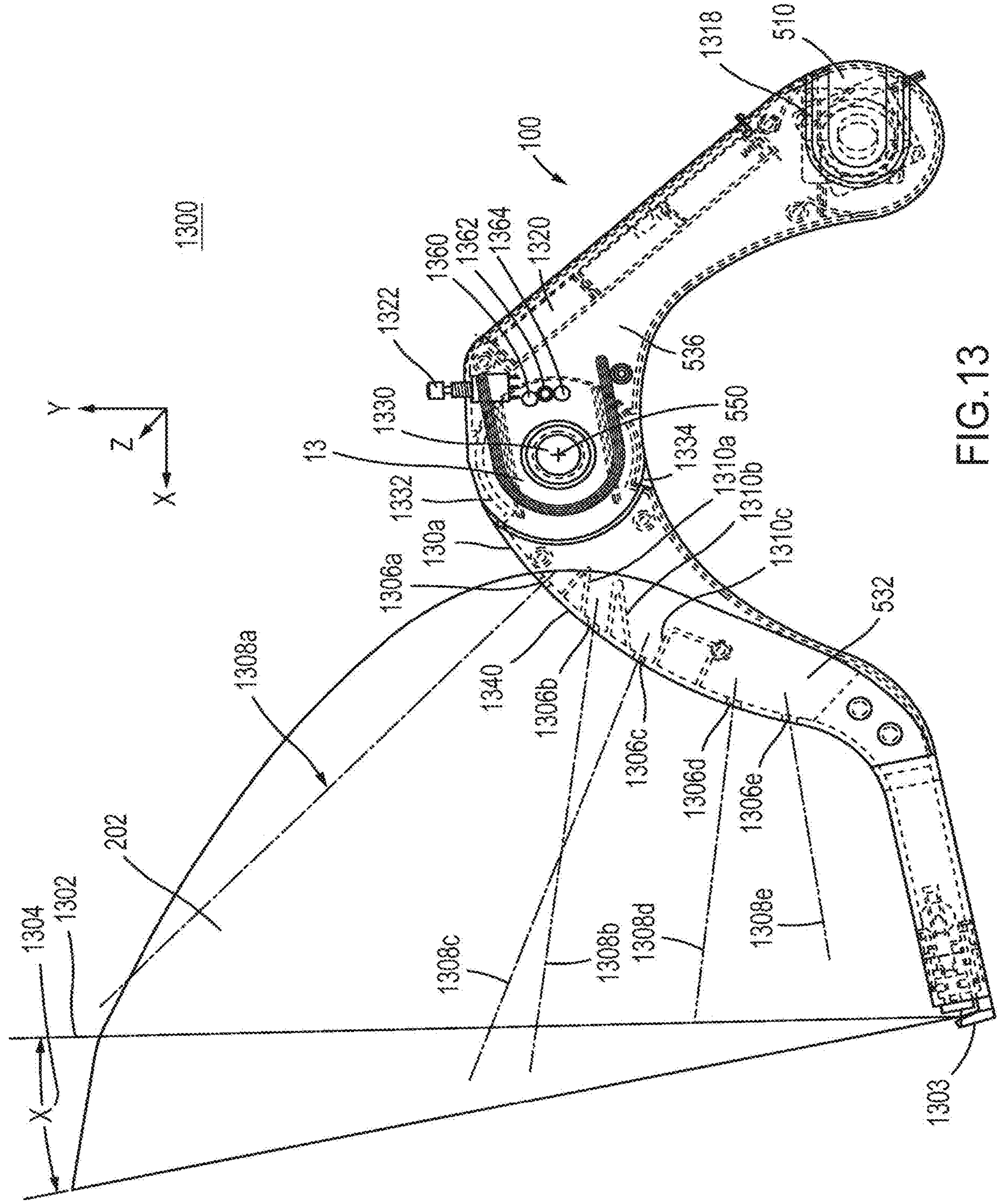
FIG. 13 is a side view of an embodiment of a yoke with a shield of the invention.

FIG. 13 is a side view 1300 of the yoke 100 with the vision shield 202 coupled thereto. The air flow directions and internal portions of the yoke are represented in broken line format. Inlet ports 518 (see, e.g. FIG. 5) are shown as a first internal air port 1306*a*, a second internal air port 1306*b*, a third internal air port 1306*c*, a fourth internal air port 1306*d*, and a fifth internal air port 1306*c*. The internal air ports are configured to communicate with the internal chambers 530, 532, 534 and 536. Some of the internal air ports can be associated with one or more air baffles. In this embodiment the air baffles are located within the yoke 100. The air ports 1306 *a-e* may be apertures in the yoke 100 or the apertures may be complimented by nozzles or the like.

The first internal air port 1306*a* is shown as an aperture in the yoke 100 chest member 102*a*. A first airflow line 1308*a* indicates the general direction of flow of air as it discharges from the first internal port 1306*a*.

The second internal air port 1306*b* is an aperture in the chest member 102*a*. Adjacent to the second port 1306*b* is a first air baffle 1310*a*. The first air baffle 1310*a* is configured to direct at least some of the air out of the internal port 1306*b*. The first air baffle 1310*a* is also configured in this embodiment to direct air into the first internal air port 1306*a*.

The third internal air port 1306*c* is an aperture in the chest member 102*a*. Adjacent to the third port 1306*c* is a second air baffle 1310*b* configured to divert air through the third port 1306*c* and in the general direction of the third airflow line 1308*c*. The second air baffle 1310*b* is also configured in this embodiment to direct air into the second internal air port 1306*b*.

The fourth internal air port 1306*d* is an aperture in the chest member 102*a*. Adjacent to the fourth port 1306*d* is a third air baffle 1310*c* configured to divert air through the fourth port 1306*d* and in the general direction of the fourth airflow line 1308*d*. The third air baffle 1310*c* is also configured in this embodiment to direct air into the third internal air port 1306*c*.

The fifth internal air port 1306*e* is an aperture in the chest member 102*a*. Adjacent to the fifth port 1306*e* is the third air baffle 1310*c* configured to divert air through the fifth port 1306*c* and in the general direction of the fourth airflow line 1308*c*.

In the embodiment illustrated in FIG. 13, the internal air ports 1306 *a-e* are located in a chest member top 130*a* of yoke 100. This position in the yoke 100 allows the air to be directed parallel to the wearer's line of sight and not onto the wearer directly. The air flow is directed along the vision shield 202, beginning where the vision shield 202 meets the yoke 100 at a yoke-shield interface line 1340. The air flow generally travels along the shield 202 until the shield curves around to mate with the second chest member 102*b*. Said another way, the shield can include a curvilinear shape; can extend from a first side of yoke 100 to a second side of yoke 100; and can curve around a chest portion 102*a-c*. The air can be diverted by the vision shield 202 and can generally travel around the shield 202 and can be directed toward the opposite side of the vision shield 202 and the second chest member 102*b*. In this embodiment, the air can travel from one of internal air ports 1306 *a-e* on a first side of the yoke 100 to an internal air port (not shown) on a second side of the yoke 100.

The quantity of internal air ports may be fewer than or greater than those illustrated in the present embodiment. The size of the apertures may also vary, and may further vary from port to port. The air can flow to the internal air ports 1306 *a-e* via one or more internal chambers, or internal chamber portions of the yoke 100. The internal chamber comprises the first chamber 532 of the chest member 102*a* which is in communication with the second chamber 536 of the back member 106*a* of the yoke 100. The hinge portion 1330 of the chest member 102*a* and the back member 106*a*, is configured to couple the chest member 102*a* and the back member 106 a such that the air can move between the chest member 102*a* and the back member 106, and the internal air ports and external air ports. As shown in FIG. 13, yoke 100 can include a blower (e.g. a fan) 1318. Blower 1318 can be disposed within the back member 106*a* and can be adjacent to the external air port 510. In this embodiment the blower 1318 can draw air into the yoke chamber, the second chamber 536, which then travels through the hinge 1330 to the first chamber 532 and out the internal air ports 1306*a-c*.

In this embodiment outlet ports 520 (see FIG. 5) have a similar arrangement, as with the first chest member 102*a* of the yoke portions illustrated in FIG. 13, in the second chest member 102*b*. A second blower can be disposed in the back member 106*b* however; the second blower can be configured to draw air out of the interior barrier space 514 through outlet ports 520, a first and second chamber of the second chest member 102*b*, through the second blower and out the second external port 512.

Also illustrated in FIG. 13 is the configuration of the vision shield 202 relative to the yoke 100. The vision shield 202 may be angled away from the vertical axis 1302 at a shield angle 1304, which may be an angle between 0 degrees and at least 45 degrees. In this embodiment the shield angle 1302 is between 20 and 30 degrees and may preferably be about 25 degrees from the vertical 'Y" axis 1302. This angle 1304 in conjunction with the configuration of the yoke 100 can offset the vision shield 202 surface from the wearer's face making the system more comfortable for the wearer. The yoke 100 extends in the X direction away from the users face, while the vision shield 202 further extends away from the face by nature of the angle, both creating the distance between the wearer's face and the shield 202 while distributing the weight of the shield 202 and garment 302 to the upper torso. Further, the shield 202 may support portions of the protective apparel that extend beyond the wearer's head, and can hold the apparel out of the wearer's face.

As shown in FIG. 13, yoke 100 can include a power system for the blower 1318 including one or more batteries 1320 and a switch 1322 coupled between the batteries 1320 and the blower 1318. The batteries 1320 and the blower 1318 can be positioned within the yoke 100 to provide counter weight to the shield 202 and the protective apparel, balancing the yoke on the wearer. The blower 1318 can be a Sunon GB0545AFV1-8 with maglev bearing for example. Those of ordinary skill in the tart will understand that other fans or blowers may achieve the results intended in accordance with this disclosure.

Figure 14:
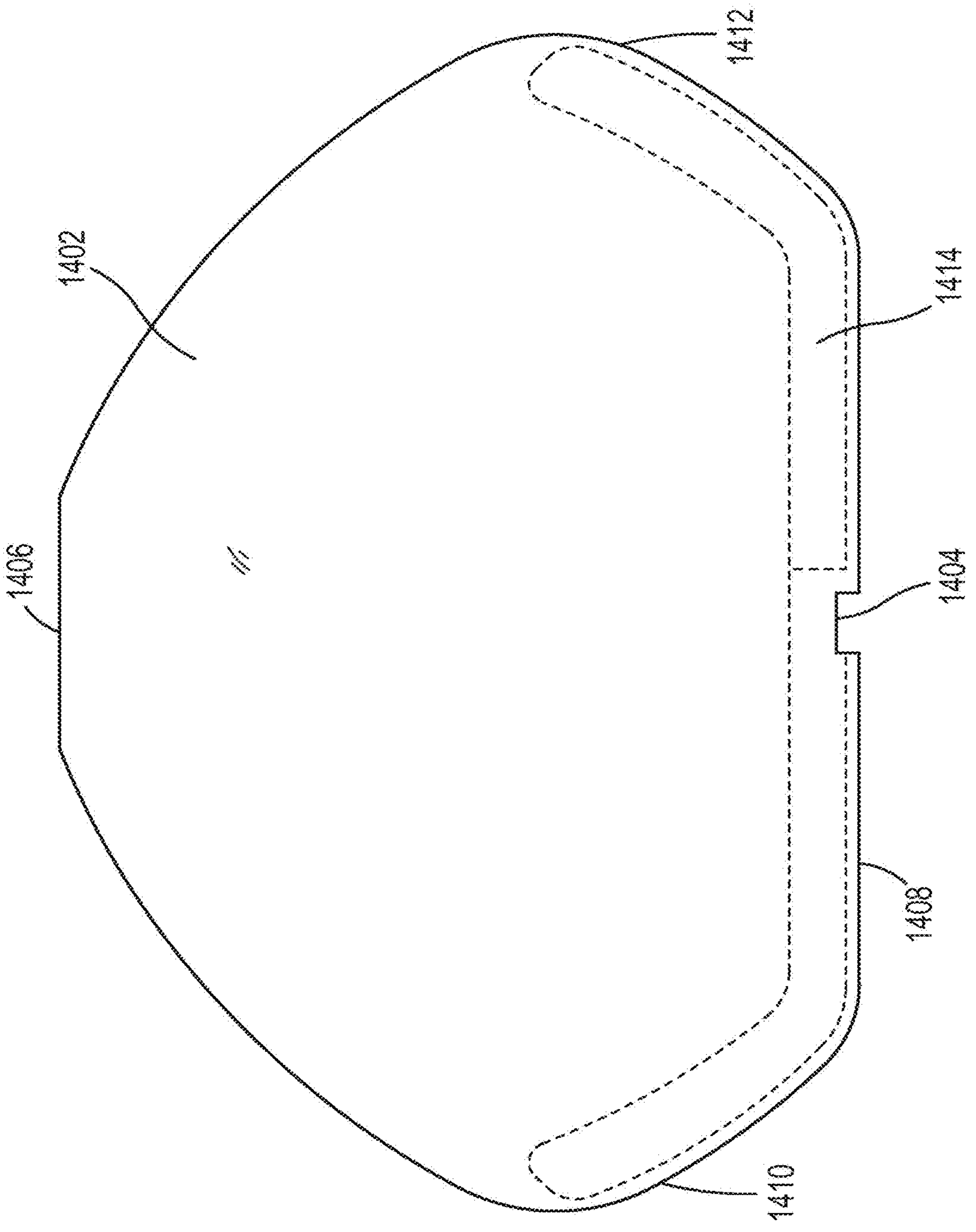
FIG. 14 is a front view of an embodiment of a shield of the invention.

FIG. 14 illustrates a shield 1402 in accordance with one embodiment of the disclosure. Shield 1402 can be similar to and can include similar elements to shield 202. In this manner, shield 1402 can be part of any protective apparel and support apparatus described herein. The shield 1402 includes a top 1406 and a bottom 1408, a first side 1410 and a second side 1412. The bottom includes a yoke engagement element 1404, which can be a void or a notch in the shield 1402 as illustrated in this embodiment. This engagement element may mate with a shield receiving element (see 1303 in FIG. 13). The first side 1410 and the second side 1412 can include portions configured to couple to the yoke 100 with securement devices such as fasteners. The fasteners may include, and are not limited to those that would secure the shield to the yoke, such as hook and loop fasteners, adhesive, buttons, snaps, keyholes, clips an the like. The shield is substantially clear and may have coating such as anti-glare, anti-reflection, hydrophobic, anti-fog and the like. The securement devise may be placed on or incorporated into the shield in the fastener area 1414.

Figure 15:
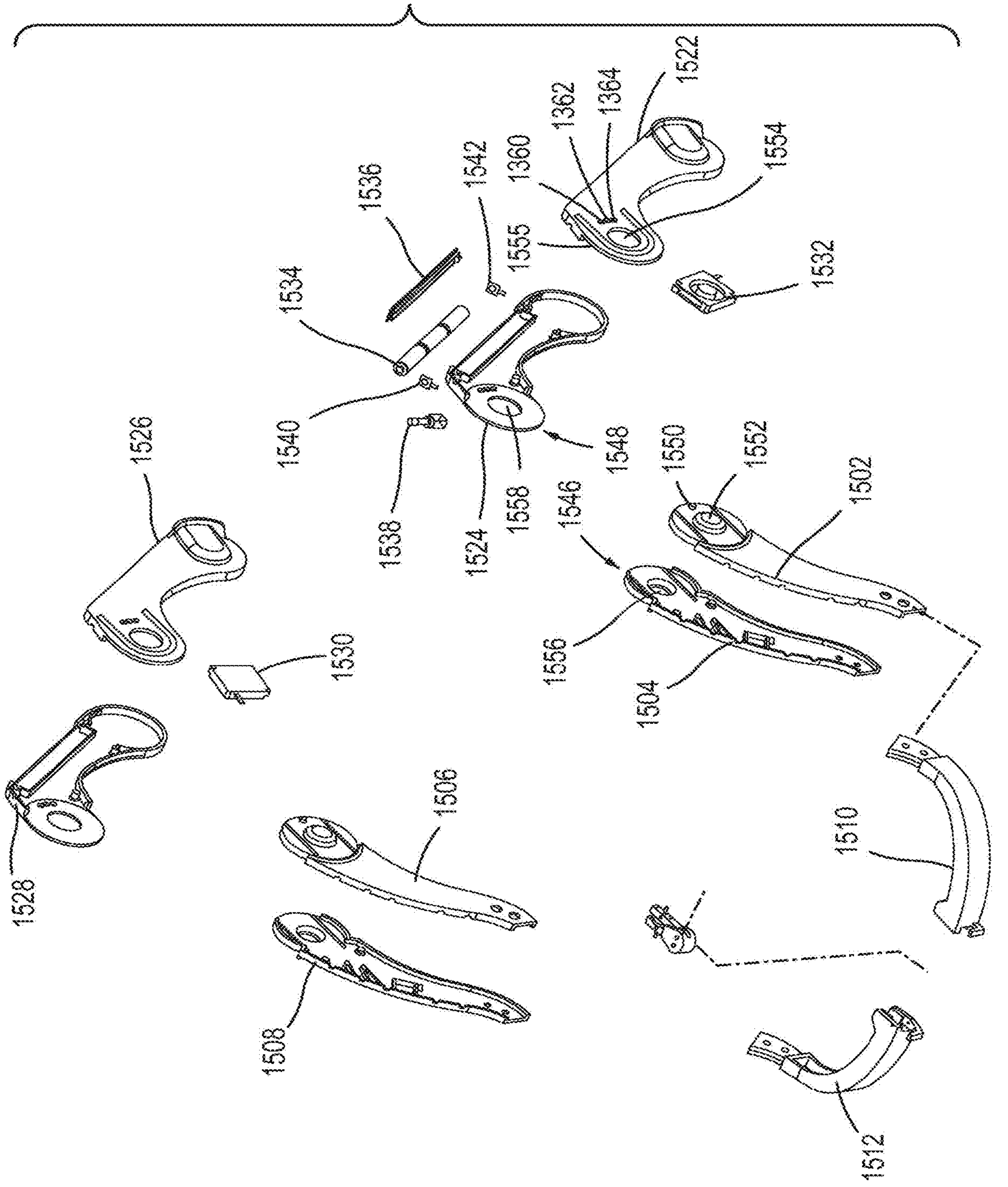
FIG. 15 is an exploded view of an embodiment of a yoke of the invention.

FIG. 15 is an exploded perspective view of the components of the yoke 100. The yoke 100 in this embodiment comprises a first chest member first half 1502 and first chest member second half 1504, a second chest member first half 1506 a second chest member second half 1508, a third chest member first half 1510 and a third chest member second half 1512. In this embodiment the third chest member first half 1510 and the third chest member second half 1512 are coupled together by a hinge 1514. The hinge may further include an adjustment device, for example a threaded adjustment device configured to adjust the angle of the hinge and hence the angle of the third chest member first half 1510 and the third chest member second half 1512.

The first chest member first half 1502 and first chest member second half 1504 are coupled together to form the first chest member 102*a*. The second chest member first half 1506 and a second chest member second half 1508 are coupled together to form the second chest member 102*b*. The first chest member 102*a* and the second chest member 102*b* have an internal chamber enclosed on four sides creating a hollow internal air flow chamber. The third chest member 102*c* includes two single piece portions 1510, 1512, which may have a chamber or may be open ended on at least one side. The halves may be secured together by screws, adhesive or other sufficient securement means as known to those of ordinary skill in the art.

The yoke 100 in this embodiment includes a first back member first half 1522 and first back member second half 1524, a second back member first half 1526 and a second back member second half 1528. A first back member first half 1522 and first back member second half 1504 are coupled together to form the first chest member 106*a*. The second chest portion first half 1506 and a second chest member second half 1508 are coupled together to form the second chest member 106*b*. The first back member 106*a* and the second back member 106*b* have an internal chamber enclosed on four sides creating a hollow internal air flow chamber.

The first chest member 102*a* and the first back member 106*a* are coupled together by hinge 108*a* as shown in FIG. 1, and similarly in FIG. 13 and in exploded view in FIG. 15. The first chest member first half 1502 and the first chest member second half 1504 are assembled to form the first chest member 102*a* with the first chest member hinge at a first end 1546 of the first chest member 102*a*. The first back member 106*a*, comprising the first back member first half 1522 and the first back member second half 1524 are assembled such that the back member hinge engages with the chest member hinge. In this embodiment the chest member hinge is partially contained within the back member hinge, e.g. in a fork like manner.

The first chest member hinge 1332 includes a first protrusion 1550 and a second protrusion 1552. The second protrusion 1552 selectively engages with a first void 1554 in the first back member hinge 1555. The second protrusion 1552 and the first void 1554 share a common axis about which is an axis of rotation 550 (see FIG. 13) for the first chest member 102*a* and the first back member 106*a*.

The second protrusion 1550 can engage one of the plurality of voids, specifically, a second void, a third void and a fourth void in this embodiment. The second protrusion 1550 in combination with one of the second void 1360 third void 1362 or fourth void 1364, can secure the first chest portion 102*a* at a first, second, or third angel relative to the back member 106*a*. The second protrusion 1550 is configured on the first end 1546 which may be flexible such that the protrusion may flex inwards and disengage the one of the second void 1360, third void 1362 or fourth void 1364. The second protrusion 1550 can include a button surface that may be accessible to a wearer's finger that is pushed on, to disengage the second protrusion from the first void 1360 of back member and allow the back member 106*a* to rotate, until the second protrusion 1550 engages another one of the voids e.g. the third void 1362 or the fourth void 1364 of the back member hinge portion.

As shown in FIG. 15, the yoke may include a power system for a first fan 1532 and a second fan 1530. The power system may include one or more batteries 1534, one or more battery contacts 1540, 1542, a battery compartment cover 1536, and a battery switch 1538.

Figure 16:
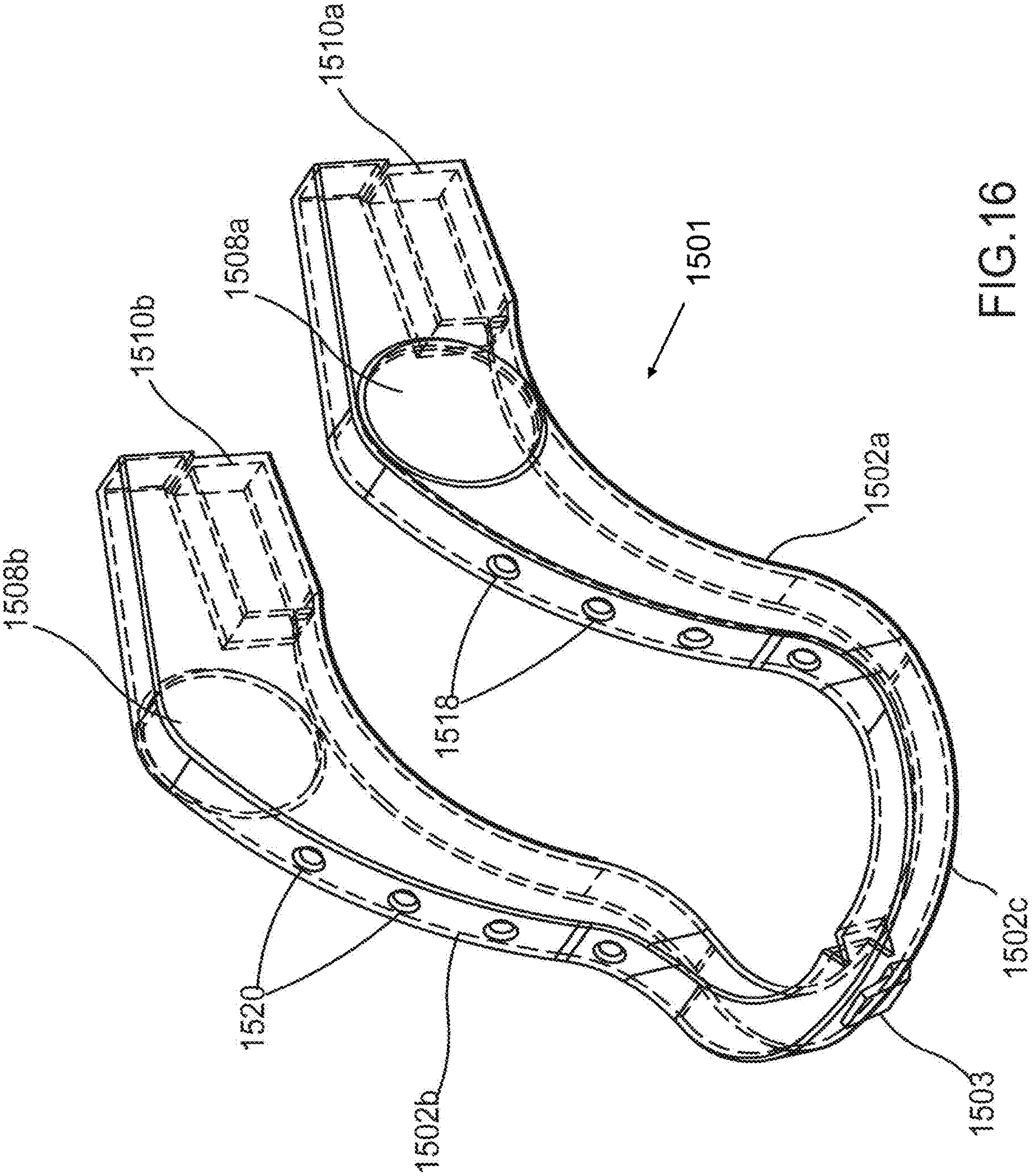
FIG. 16 is a perspective view of a yoke according to an embodiment.
Figure 17:
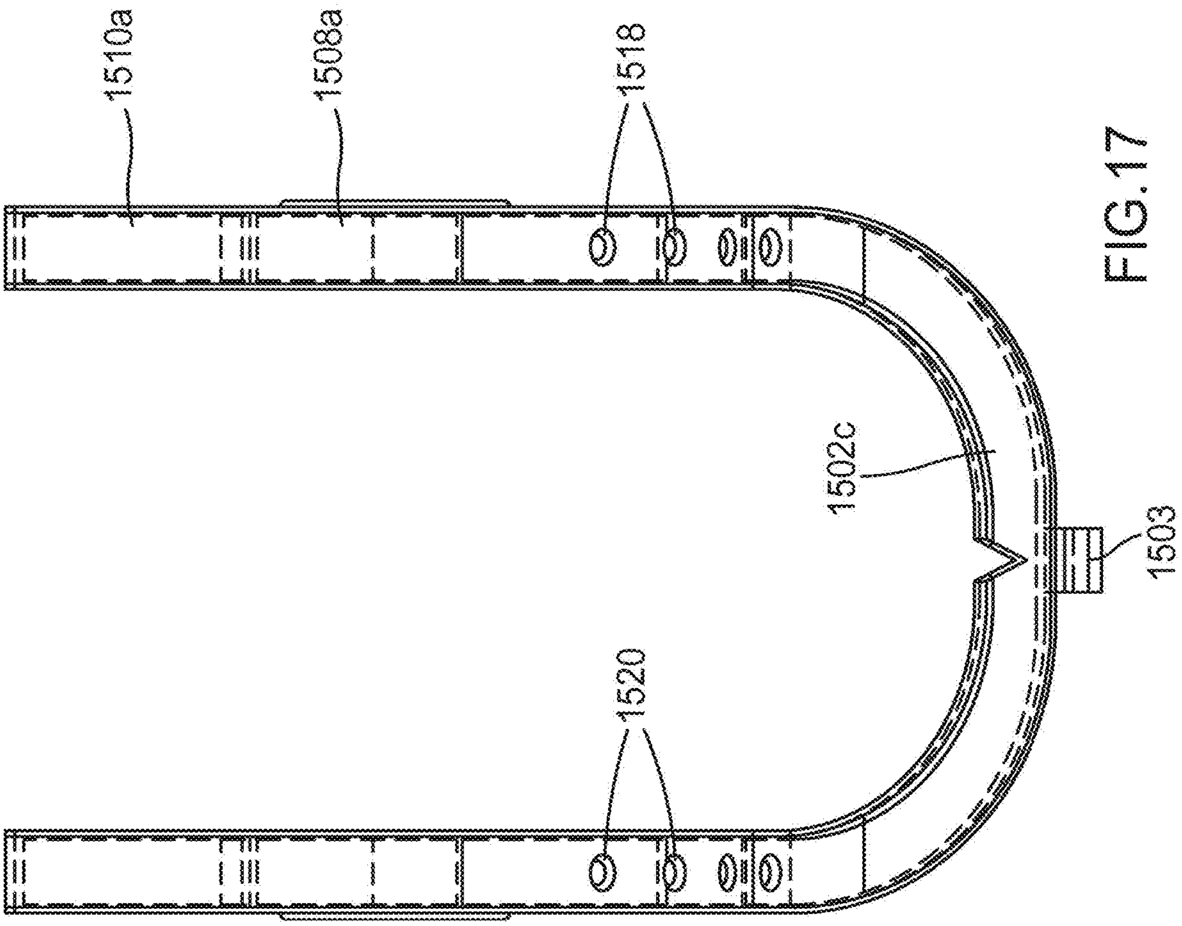
FIG. 17 is a top view of the yoke embodiment shown in FIG. 16.
Figure 18:
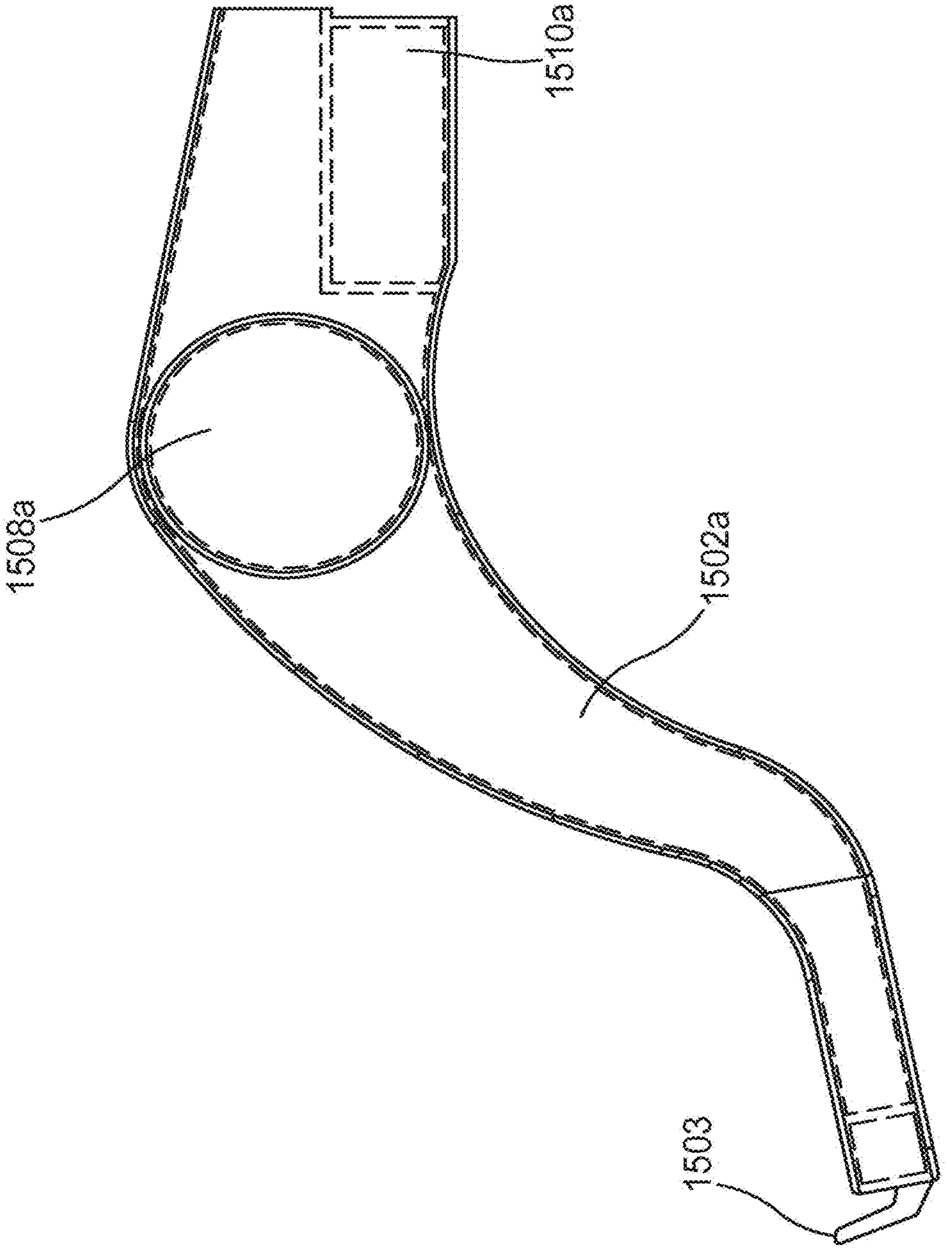
FIG. 18 is a side view of the yoke embodiment shown in FIG. 16
Figure 19B:
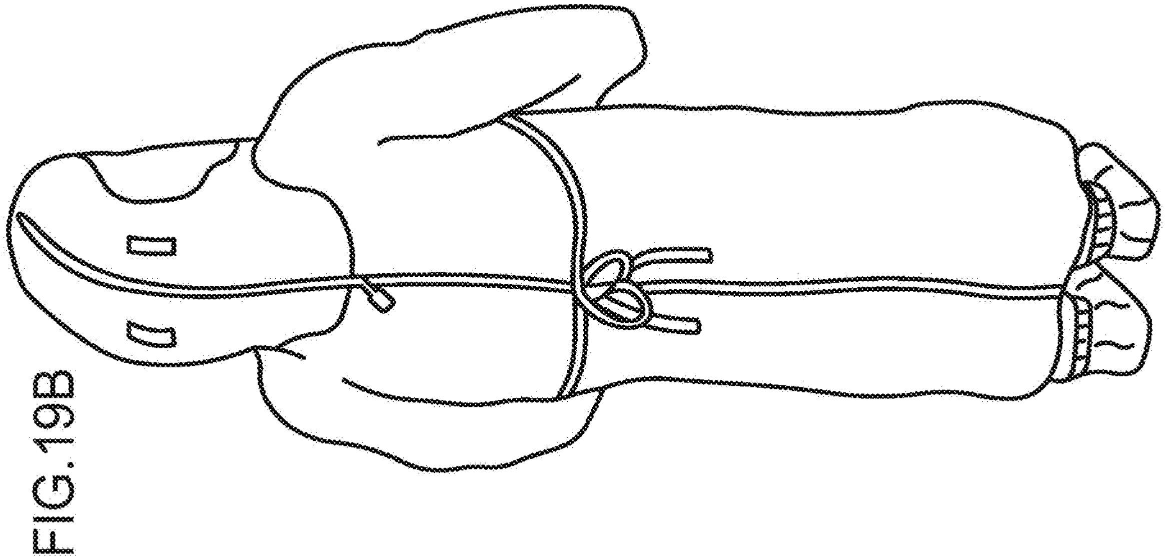
FIG. 19B illustrates a first rear perspective view of an additional embodiment of a protective apparel shown in FIG. 19A.
Figure 19A:
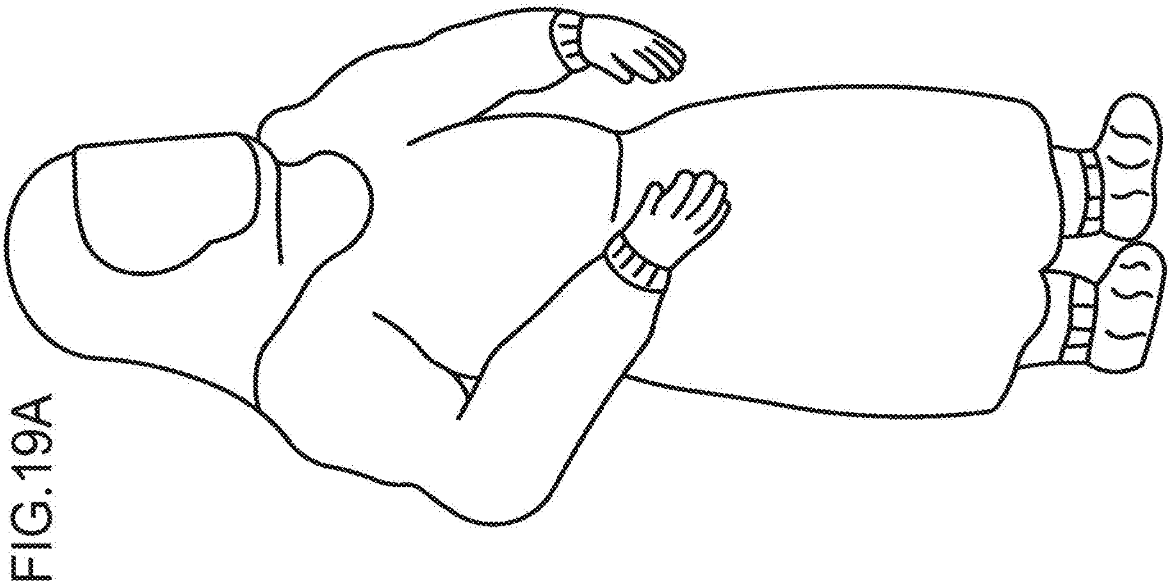
FIG. 19A illustrates a first front perspective view of the protective apparel embodiment.
Figure 19D:
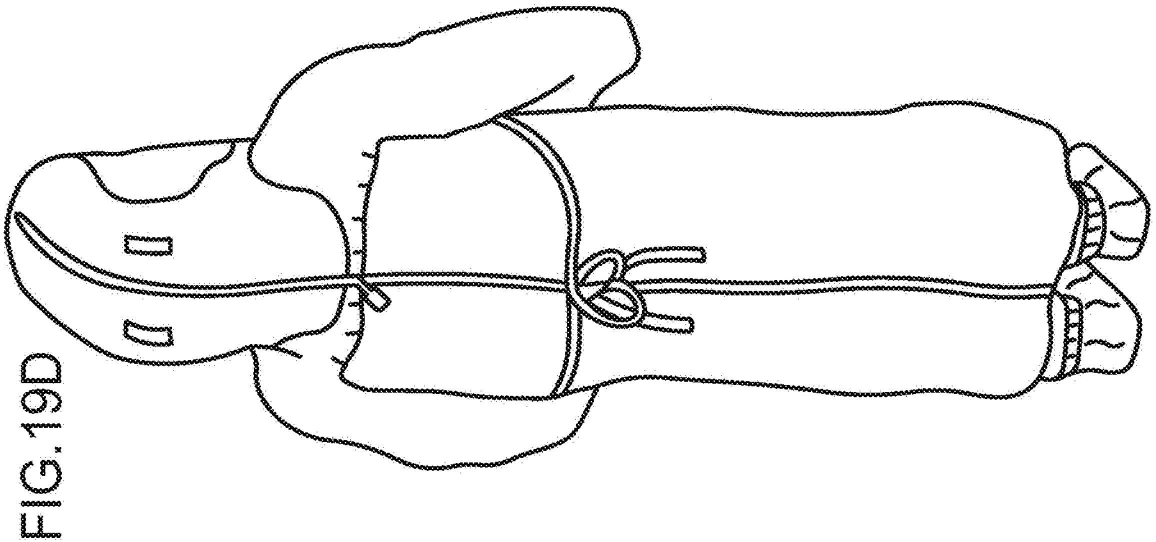
FIG. 19D illustrates a first rear perspective view of the protective apparel embodiment shown in FIG. 19C.
Figure 19C:
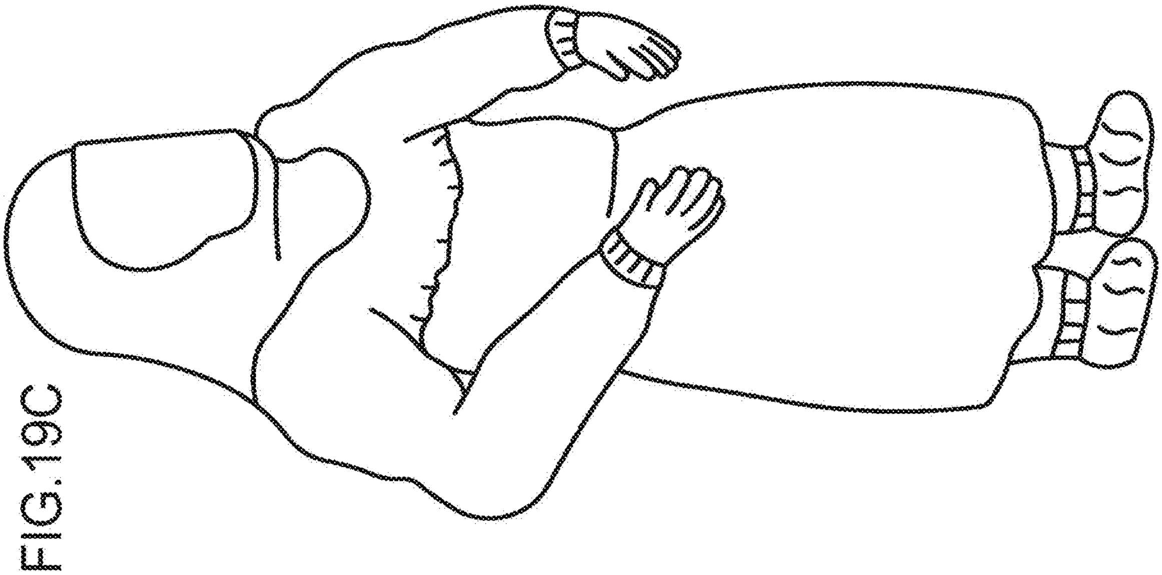
FIG. 19C illustrates a first front perspective view of an additional embodiment of a protective apparel.

FIGS. 16-18 are views of a yoke 1501 according to another embodiment. Specifically, FIG. 16 is a perspective view of yoke 1501, FIG. 17 is a top view of yoke 1501, and FIG. 18 is a side view of yoke 1501. Yoke 1501 includes a first chest member 1502*a*, a second chest member 1502*b*, and a lateral chest member 1502*c*, a plurality of inlets 518, a plurality of outlets 1520, a vision shield support 1503, a first fan 1508*a* and a second fan 1508*b*, and a first battery compartment 1510*a* and a second battery compartment 1510*b*. Yoke 1501 can include similar elements with similar features with yoke 100. For example, first chest member 1502*a* can be similar to first chest member 102*a*. As seen in FIG. 16-18, and in contrast to yoke 100 described above, yoke 1501 does not include back members. In some embodiments, first battery compartment 1510*a* and second battery compartment 1510*b* can be arranged such that one or more batteries (not shown) can be removed and/or otherwise replaced while yoke 1501 is in use, e.g., during a surgery or other procedure. In some embodiments, first fan 1508*a*, second fan 1508*b*, and/or the one or more batteries can be sized to counterbalance first chest member 102*a*, second chest member 102*b*, and/or lateral chest member 102*c*.

Figure 20:
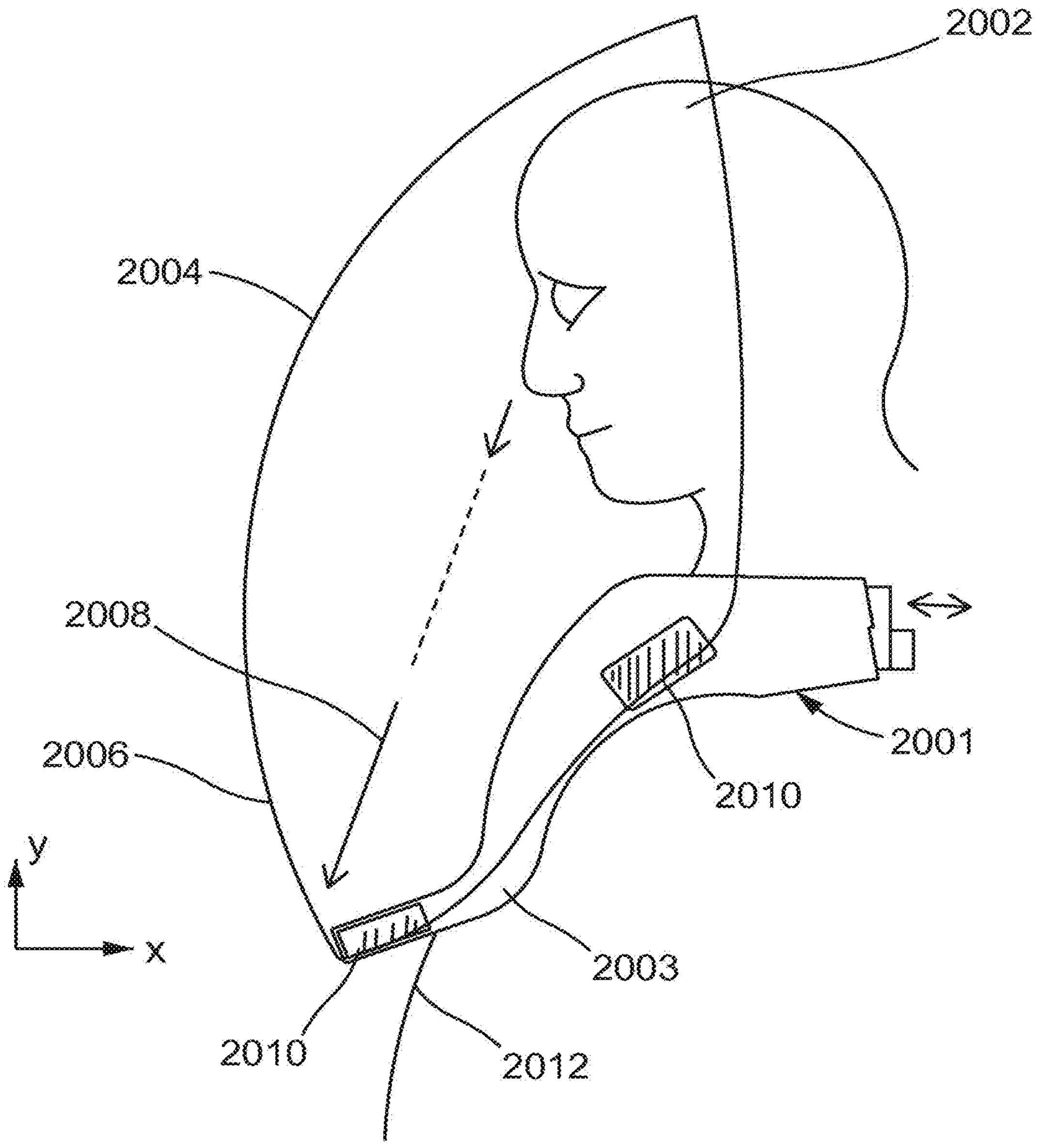
FIG. 20 is a side view of an embodiment of a yoke donned by a wearer of the invention.

FIG. 20 is a side view of a yoke 2001 according to an embodiment. Yoke 2001 includes a chest member 2003 that can be disposed on a chest 2012 of a wearer and can be close to a front of a neck (not shown) of the wearer's. Chest portion 2003 can be configured such that a wearer's line of sight 2008 may not be obstructed. As shown in FIG. 20, yoke 2001 can primarily and/or completely rest on the wearer's chest 2012. In some embodiments yoke 2001 can arch over the wearer's shoulders (not shown) and can extend to a back (not shown) of the wearer as disclosed in other embodiments (see, e.g., FIG. 4). As shown in FIG. 20, a vision shield 2002 has an upper portion 2004 and a lower portion 2006. Lower portion 2006 can extend inwardly towards the wearer. Vision shield 2002 can be configured with a concave bubble shape to provide an extended field of vision and can maintain a substantially undistorted view of the subject and area surrounding the wearer. In this embodiment, vision shield 2002 can be pre-formed in the concave shape. As discussed above, in some embodiments, vision shield 2002 can be other shapes, such as, for example, rectangular, square, etc., and can be pre-formed, or formed when vision shield 2002 is coupled to yoke 2001.

Vision shield 2002 can be coupled to yoke 2001 by an attachment device, such as hook and loop, adhesive, buttons, snaps, keyholes, clips, magnets or the like. As shown in FIG. 20, yoke 2001 includes hook and loop fasteners 2010. Hook and loop fastener 2010 can include a first hook or loop fastener carried on the yoke 2001 and an associated hook and loop fastener carried on vision shield 2002. Yoke 2001 can be secured to vision shield 2002 by any number of hook and look fasteners 2010. In some embodiments, vision shield 2002 can be sized such that alignment of vision shield 2002 to yoke 2001 is not critical. Said another way, a small misalignment of vision shield 2002 may not obstruct lines of sight 2008 of the wearer. Although the size of vision shield 2002 can allow for variable alignment relative to yoke 2001, the shape of the vision shield can be complimentary to yoke 2001.

The vision shield 2002, configured in the pre-formed concave manner, can allow for stackability during shipping and storage. In one embodiment, vision shield 2002 can be coupled to the protective apparel (not shown) and can be folded and stacked together for storage and shipping to the end user. Vision shield 2002 can be attached to the protective apparel with adhesive, stitched, ultrasonically bonded, or the like. In one embodiment the garment is made of a non-woven material. In other embodiments, the protective apparel can include any materials described herein. In other embodiments, vision shield 2002 can be coupled to the protective apparel just prior to donning on the yoke, e.g. after manufacture and shipping.

In some embodiments, vision shield 2002 can include a thickness between about 0.005 inches and about 0.050 inches. In some embodiments, vision shield 2002 can includes polycarbonate material. In other embodiments, vision shield 2002 can includes polyethylene terephthalate (PET) materials. In some such embodiments, vision shield 2002 can include polyethylene terephtalate glycol-modified (PET-G) materials. While described herein as including the above thicknesses and/or materials, in some embodiments, vision shield 2002 can include other suitable thicknesses and/or materials.

Figure 21:
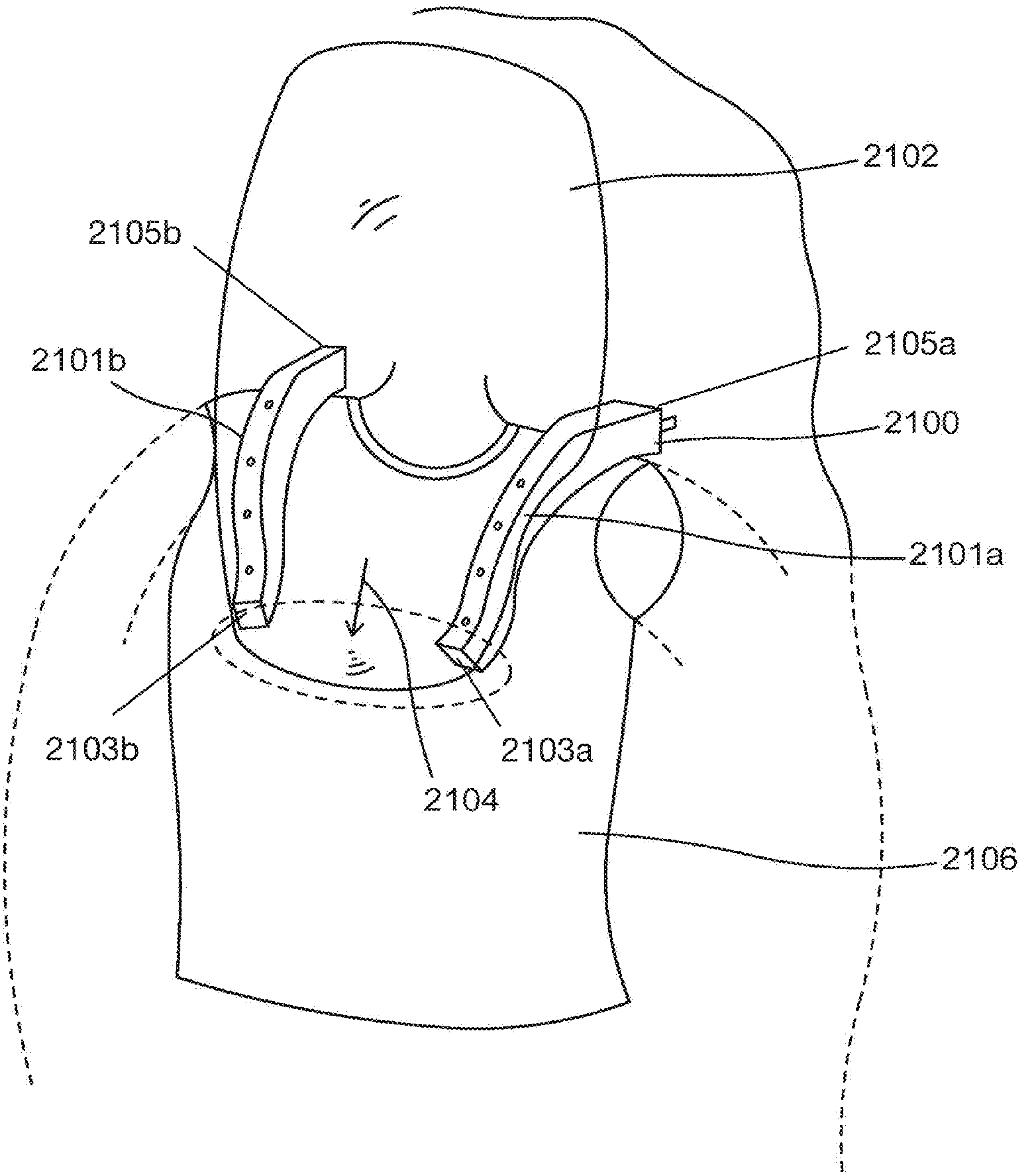
FIG. 21 is a perspective view of an embodiment of a yoke donned by a wearer of the invention.

While some embodiments depict a chest member including three portions (see, e.g., FIG. 1), specifically a first chest member, a second chest member, and a lateral chest member, in other embodiments, a yoke may not include a lateral chest member portion. FIG. 21 is a perspective view of a yoke 2100 disposed on a wearer. Yoke 2100 includes first chest member 2101*a* and a second chest member 2101*b* which are not connected across the chest of the wear with a lateral chest member. The first chest member 2101*a* may have a forward end 2103*a* and a rearward end 2105*a*, and the second chest member 2101*b* may have a forward end 2103*b* and a rearward end 2105*b*. The rearward ends 2105*a*, 2105*b* of the chest members 2101*a*, 2101*b* may connect to further portions of the yoke, and forward ends 2103*a*, 2103*b* may be spaced apart such that a gap in the chest member is formed at a chest portion 2104. Absent the lateral chest member, Yoke 2100 may include non-mutually exclusive elements and features similar to elements of yoke 100. The absence of yoke 2100 lateral chest member may increase visibility below the wearer's head. In this embodiment, a vision shield 2102 can extend all the way to the wearer's chest 2106 at a chest portion 2104, without being obstructed by a lateral chest member for example.

Figure 22:
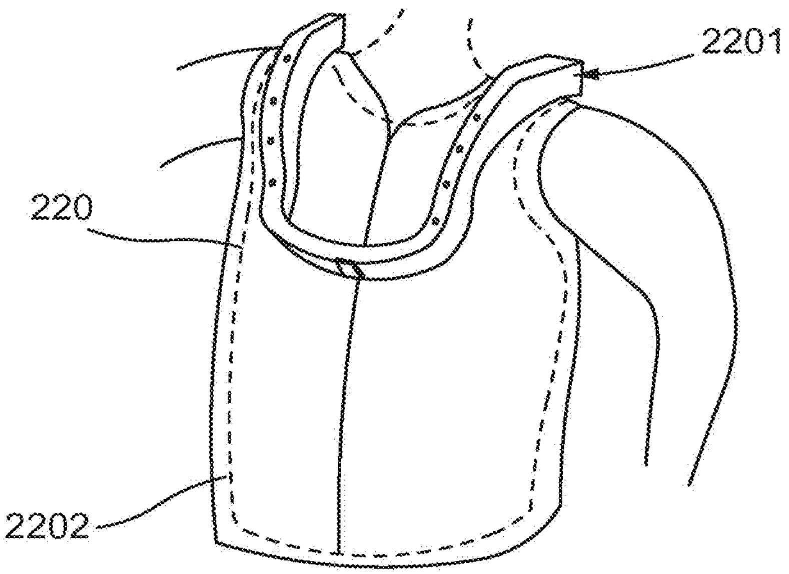
FIG. 22 is a perspective view of an embodiment of a yoke donned by a wearer of the invention.

FIG. 22 is a view of a yoke 2201 coupled to a securement device 2202. The securement device 2202 may be a garment adapted to couple with the yoke 2201 and/or with the protective apparel (not shown) portions thereof. Yoke 2201 can be permanently coupled to the torso securement device 2202 or may be detachably coupled thereto. Embodiments where yoke 2201 is detachably coupled can allow for interchangeability, cleaning of securement device 2201. The securement device 2202 can, as illustrated in this embodiment be a vest, or alternatively for example may be a jacket, shirt, scrub or other torso securement device or the like generally worn by a user.

In some embodiments, securement device 2202 can includes a fastening system, such as those described herein, to couple a vision shield and/or protective apparel to securement device 2202 and/or yoke 2201, and/or to compliment a fastening system of yoke 2201. In such embodiments, clips or attachment portions on the securement device can mate with complimentary clips or attachment portions on the vision shield and/or protective apparel and/or portions thereof.

Figure 23:
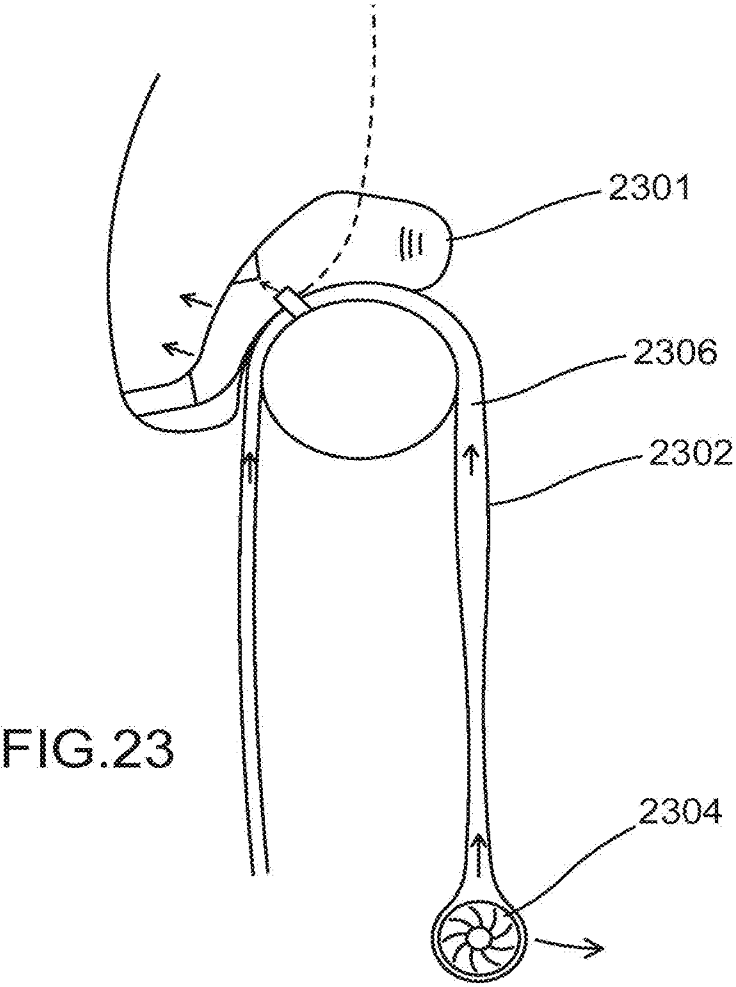
FIG. 23 is a side view of an embodiment of a yoke donned by a wearer of the invention.

While embodiments described herein show heating and/or cooling devices integral with a yoke, in other embodiments, a heating and/or cooling system can be integral to a securement device, and that heating and/or cooling system can feed into the yoke. For example, as shown in FIG. 23, a securement device 2302 can include a fan 2304 configured to direct air through one or more air flow channels 2306 of securement device 2302 and into yoke 2301. In such embodiments, securement device 2302 can include a heating and/or cooling elements (not shown) to modify a temperature of the air flow from fan 2304. Such heating and/or cooling elements can be, for example, electrical (e.g., battery or plug elements), chemical (e.g., heat and/or ice packs), etc. In such embodiments, securement device 2302 can include pockets and/or phase change material used for temperature management.

Figure 24:
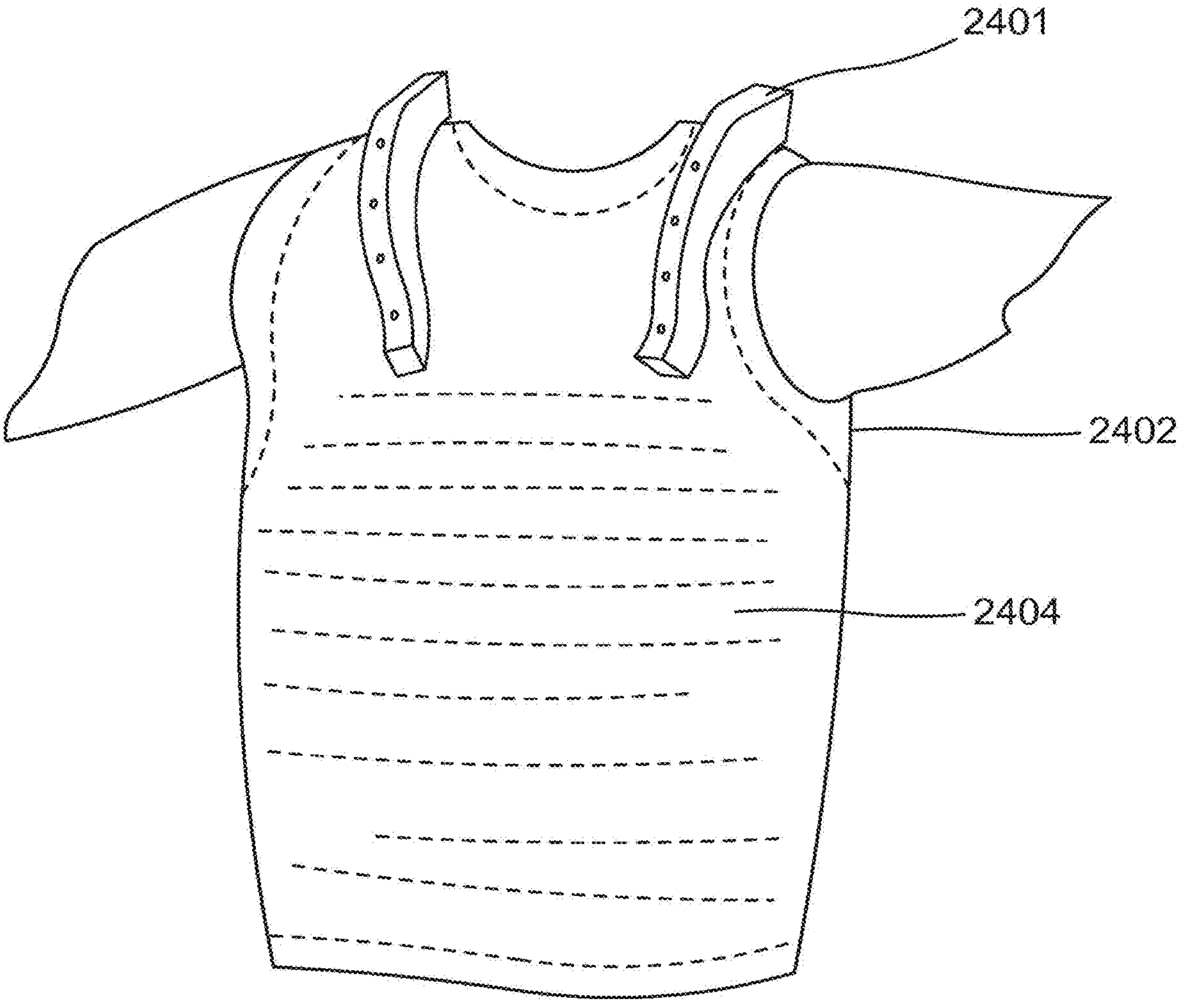
FIG. 24 is a perspective view of a yoke and securement device donned by a wearer according to an embodiment.

In some embodiments, a securement device and/or protective apparel can include radiation shielding. For example, as shown in FIG. 24, a yoke 2401 can be coupled to a securement device 2402 which can include x-ray protective portion 2404. In such embodiments, x-ray protective portion 2404 can include lead to protect the wearer while taking x-rays during a procedure. The lead can be attached to securement device 2402 by any suitable means for example may be held in pockets or sewn in or adhesively attached to the vest, a combination thereof or the like.

Figure 25:
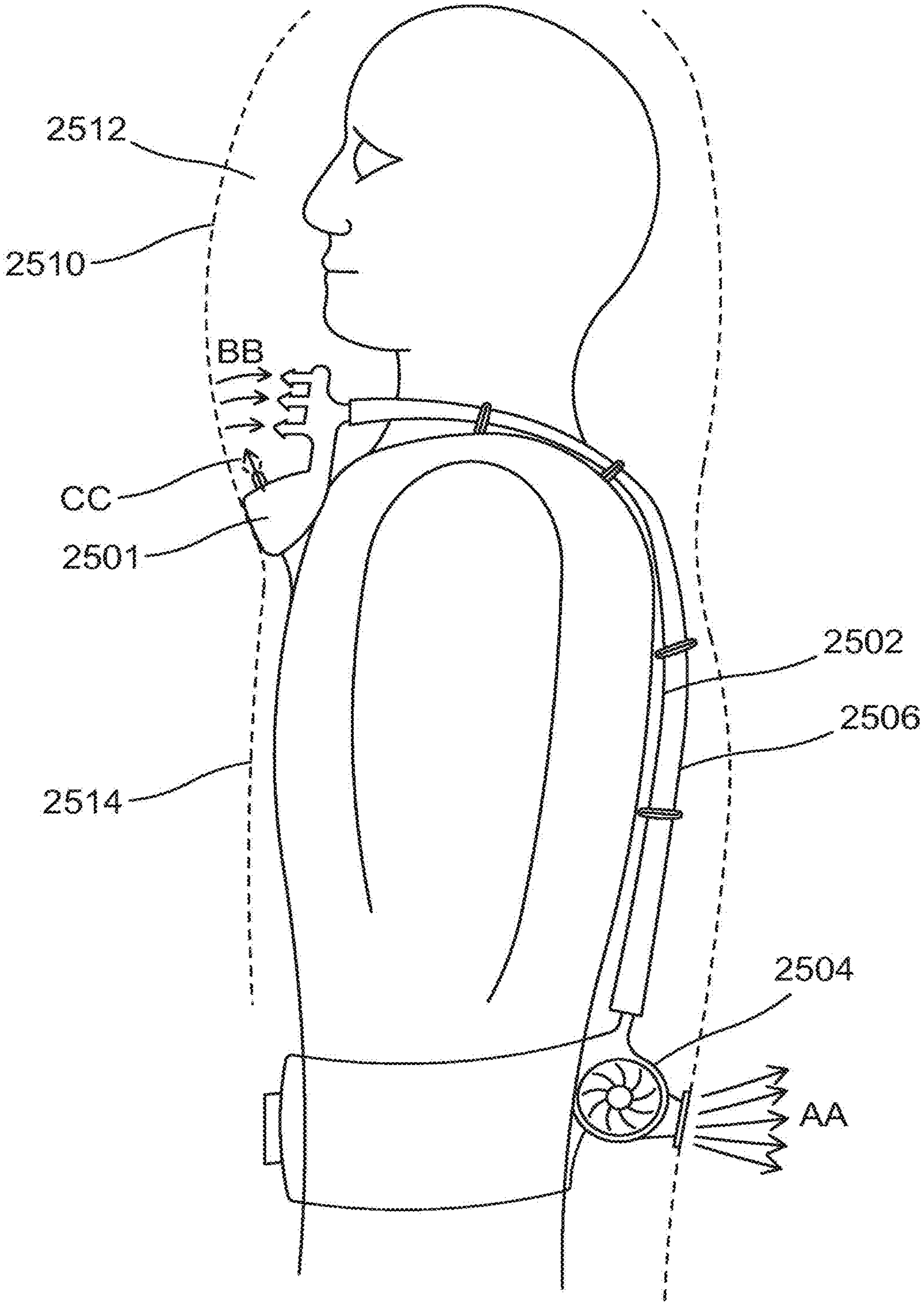
FIG. 25 is a side view of a yoke and securement device donned by a wearer according to an embodiment.

FIG. 25 is a side view of a protective apparel and support apparatus according to another embodiment. The apparatus includes a yoke 2501 coupled to a fan 2504 via an air flow channel 2506. In some embodiments, air flow channel 2506 can be outside of and coupled to a securement device 2502. The apparatus can include a vision shield 2510 and protective apparel 2512. Fan 2504 can supply air flow to yoke 2501 and to a barrier space 2512 indirection CC. Fan 2504 can exhaust air from barrier space 2512 in direction BB and can exhaust air from air flow channel 2506 in direction AA.

In embodiments with one or more fans, the one or more fans can draw air into, and exhaust air out of, a securement device, protective apparel and/or yoke via ports. Air channels can be built into and/or coupled to a securement device and/or protective apparel. The air flow may be directed over heating or cooling pacts to condition the air. If a support is coupled to the vest, an air passage port can be coupled the air passage of the vest to the interior of the support to channel air around the support and about the wearers head. In some embodiments, a single fan can both intake and exhaust air from the apparatus. In some embodiments, a securement device and/or protective apparent can include three dimensional (3D) fabrics, wherein air flow is directed within the 3D fabric, for example, air channels within around the vest. Channels in the vest can be defined in the fabric to direct the air to desired portions.

In some embodiments, a protective apparel and support apparatus can include one or more electronic devices, such as, for example, a camera, a projector, a microphone, a speaker, gesture module, network communication device, and/or control device (e.g., for controlling a fan, camera, etc). In such embodiments, the one or more electronic devices can be wired, wireless, and/or both wired and wireless. In some embodiments, the control device can control the one or more electronic devices. In other embodiments, the one or more electronic devices can be controlled remotely via the network communication device. In some embodiments, environmental and vital readings of the wearer can be transmitted via the network communication device. In some embodiments, the apparatus can include a single control device configured to control all electronics devices. In other embodiments, the apparatus can include multiple control devices associated with less than all the electronic devices. The control device can be a remote control, can be handheld, can be mounted on the yoke, protective apparel, can be foot operated (e.g., a foot pedal) and/or securement device, and/or can be controlled via a network connection. In some embodiments, a control device can change a speed of a fan and hence airflow in and out of the interior barrier space.

In some embodiments, a camera can be coupled to the yoke and can be aimed in one or more directions. Some camera positions are adjacent to a vision shield and the vision shield can include a camera lens portion The yoke may have communications modules such as the microphone, the speaker, the wireless communication device, configured to communicate with a second communication device remote from the surgeon, for example other personal involved in the procedure whether in the room or not. A voice recognition module can be configured to activate the wearer's microphone circuit upon speaking to communicate without having to press a button so that the wearer may keep their hands free. The fan speed control may be voice activated as well. In one embodiment the wearer can use voice commands to activate different functions, such as fan on and off, fan speed, temperature, control music, or for other communications.

For example, the wearer can be able to instruct the system to turn on the fans by speaking "fan on." Or change the fan speed by speaking "fan three" or "fan up." These are exemplary commands only and it is understood that any commands can be used. Feedback to acknowledge receipt of the command, correctly or erroneously, can be issued by audible, visible, tactile, or physical indication may be presented to the wearer. For example an audible beep through a speaker or the like can signal that the command was heard but not received properly or understood. Alternatively or additionally, a light may flash or a vibrator can activate to give a physical response to the command. Lights, such a light emitting diodes (LED) can be placed in visible locations to the wearer to represent and indicate the existence of predetermined conditions.

In some embodiments, a gesture module can be incorporated into the apparatus so that the wearer can command different functions associated with the system by making gestures. Gestures can be detected by accelerometers or a camera system such as a yoke mounted camera, yoke mounted accelerometers or a combination thereof. The accelerometers may be carried on the protective apparel such as the sleeves or the yoke or securement device. A camera mounted in the yoke or vest portion may be aimed at the wearer, such as the head to detect motion and gestures by the wearer. Moving the head in a predefined motion gesture can signal the fan to increase speed for example. In some embodiments, electronic devices can be controlled by a combination of voice and gesture commands, and or can have redundant commands, for example, a voice command to change fan speed, as well as a gesture command to change fan speed.

In some embodiments, a protective apparel and support apparatus can include one or more magnets configured to couple a vision shield to a yoke. In some embodiments a securement device can include one or more clips to retain the protective hood/vision shield and may not include a yoke. In such embodiments, air can be ported from the protective apparel and/or securement device into the inner barrier and around the wearer. In such embodiments, a fan can be disposed into a portion of the protective apparel and/or securement device. In some embodiments, the apparatus can include LED lights, configured to produce low or no heat and can be disposed adjacent to the vision shield to prevent glare. In some embodiments, a vision shield can be preformed, e.g. can hold a shape when not secured to a yoke, securement device and/or protective apparel. In some embodiments, a vision shield can be supported by a yoke, and the vision shield can provide the sole direct support of a protective garment. In some embodiments, a yoke can include at least one air port directed at the wearer, for example, a neck of the wearer, such that a wearer can know that air flow is present. In some embodiments, a vision shield can extend over and around a wearer's head to substantially encapsulate a wearer's head such that the wearer can have a substantially panoramic view.

In some embodiments, a vision shield can include a portion that can present and/or otherwise function as a heads-up-display (HUD). A projector can be configured in the yoke, securement device, and/or protective apparel that can be aimed at the vision shield. The projector can project protective apparel data such as fan speed, battery power remaining, or critical patient data such as body temperature, blood pressure, hear rate/pulse and the like. A portion of the vision shield can be configured to display the information. For example, a portion of the vision can be etched or darkened in order to create the HUD effect. A projector can be coupled to a wireless receiver to receive the data from monitoring equipment. Each piece of monitoring equipment can include a communication module to transmit that data to the projector wireless receiver. In other embodiments, monitoring equipment can share a common communication module.

In some embodiments, an apparatus can include one or more supports that can extend up from a waist of a wearer, can be included in a securement device. In such embodiments, the supports can hold the yoke off of the shoulders and can transfer at least a portion of the load to the waist and hip area of the wearer. In one such embodiment, a waist belt can be coupled to a rigid back support that can extend upwards along the wearer's back, and up and over a wearer's shoulders, and can be coupled to a chest brace. Air tubes or channels can be brought up and over the wearer's body to the front of the wearer's face to circulate fresh air to the internal chamber. A vision shield can be coupled to the yoke.

The control device can be located in the front portion of the yoke, the protective apparel, and/or securement device as described herein. The control device can be positioned at a location within the sterile field of the wearer such that accessing the controls may not require the wearer to breach the sterile field. A switch set for fan on/of and up/down speed controls can be located at easy to access positions on the yoke or securement device for example. The controls on the control device can be physical button switches, virtual buttons, or reed switches or the like. In other embodiments, as described above, the control device can accept voice, visual, and/or gesture commands.

Figure 26:
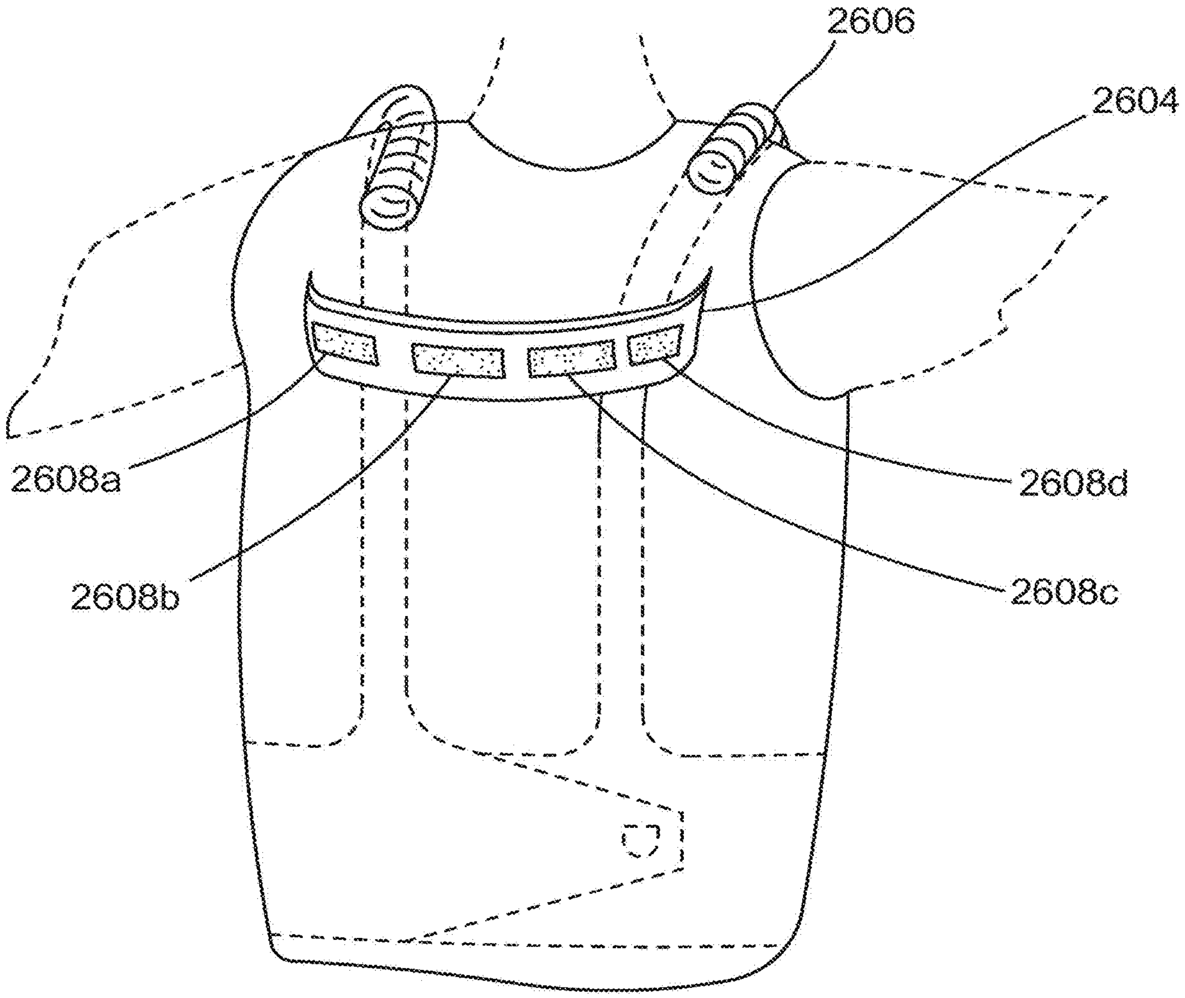
FIG. 26 is a perspective view of a yoke and securement device donned by a wearer according to an embodiment.

FIG. 26 is a perspective view of a control device 2604 coupled to a securement device 2602 including air flow channels 2606. Control device 2604 includes a plurality of electronics modules 2608*a-d*. In some embodiments, control device 2604 can be integral with a yoke, in other embodiments, control device 2604 can be integral with securement device 2602 and/or protective apparel. In other embodiments, control device 2604 can be separate from, but coupled to any of the yoke, the protective apparel, and/or securement device 2602. Electronics modules 2608*a-d* can include any input and/or output device, for example microphone, speaker, lights, fan control, camera, and/or projector.

Figure 27:
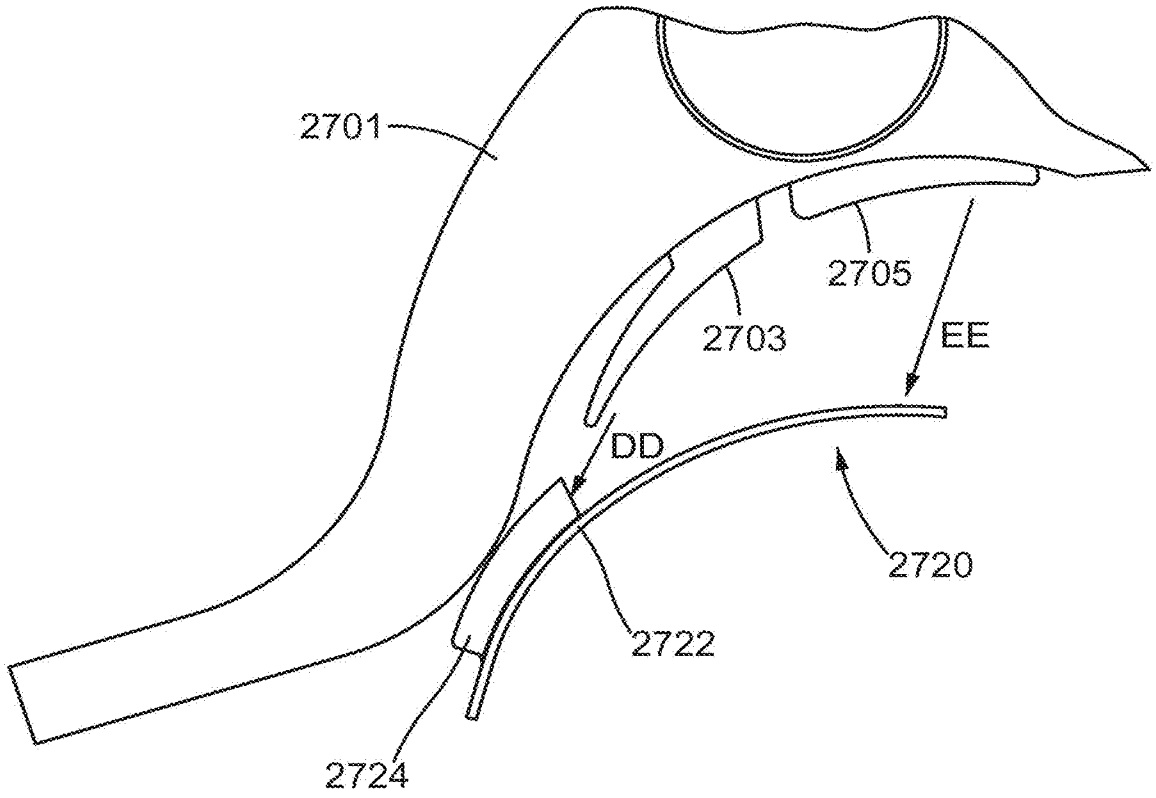
FIG. 27 is a side view of yoke coupling to a yoke receiver according to an embodiment in a first configuration.
Figure 28:
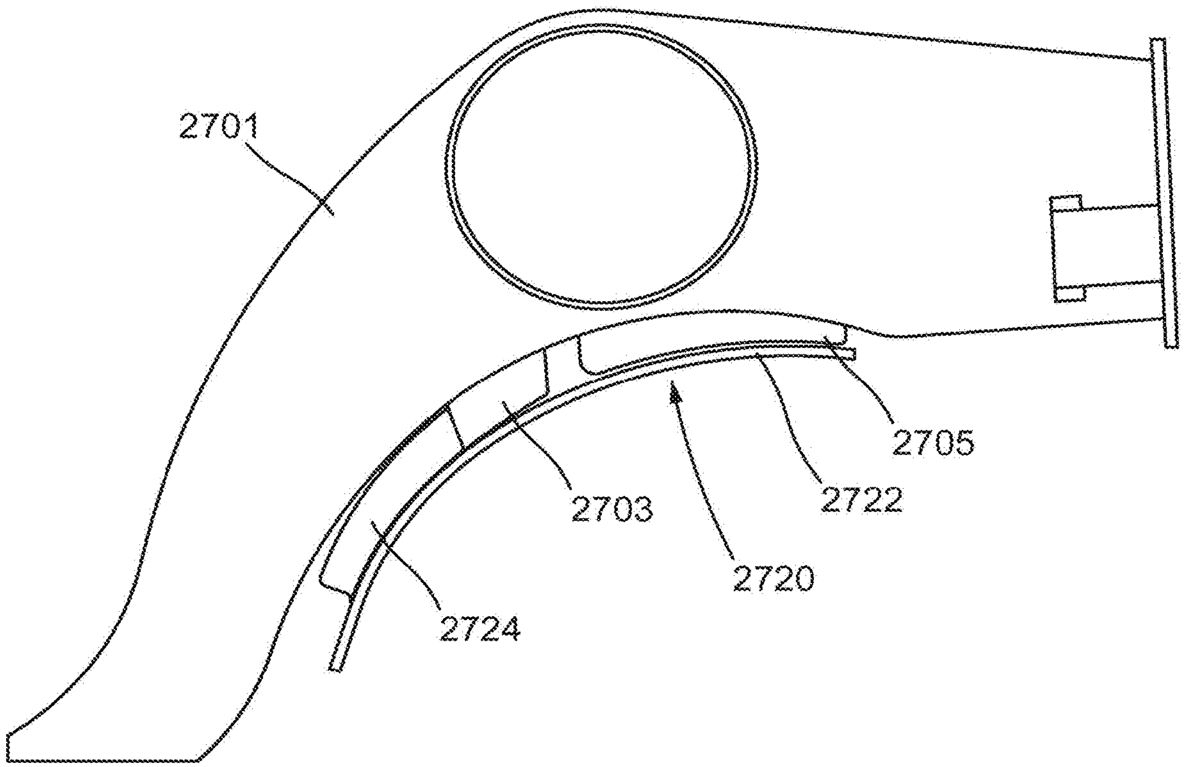
FIG. 28 is a side view of yoke coupling to a yoke receiver according to an embodiment in a second configuration.
Figure 29:
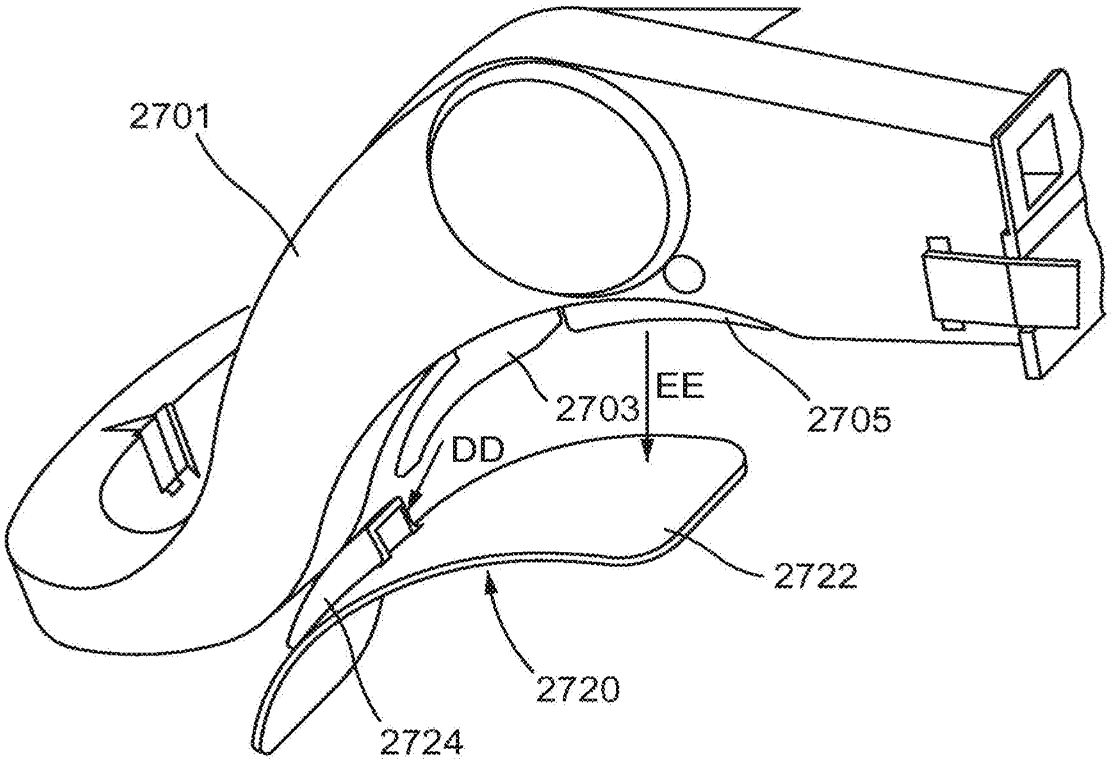
FIG. 29 is a perspective view of yoke coupling to a yoke receiver according to an embodiment in the first configuration.
Figure 32:
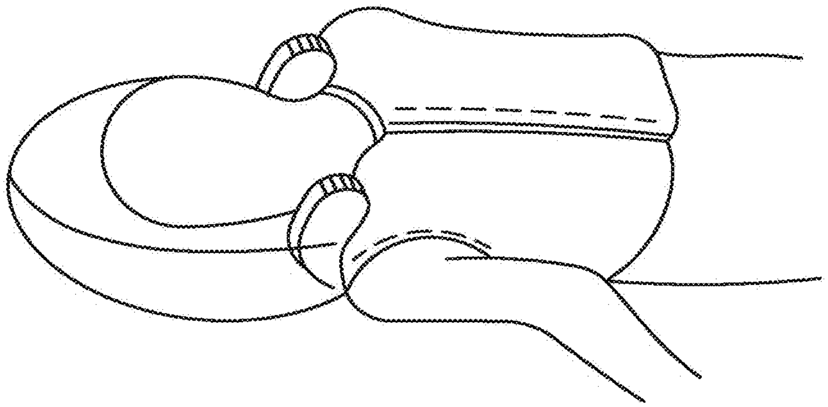
FIG. 32 is a back perspective view of the protective apparel embodiment shown in FIG. 30.
Figure 31:
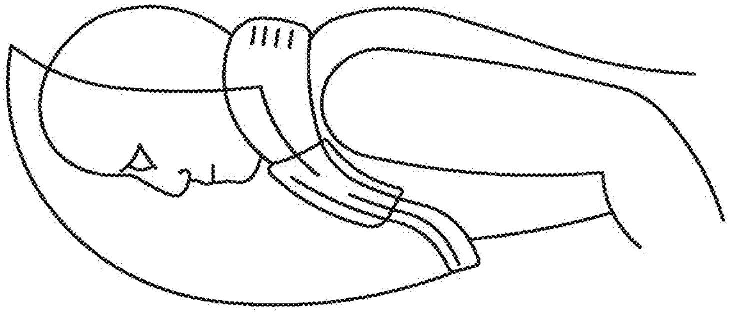
FIG. 31 is a side view of the protective apparel embodiment shown in FIG. 30.
Figure 30:
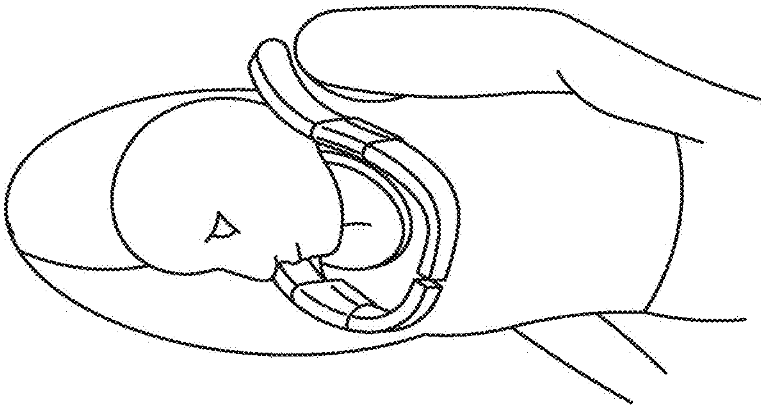
FIG. 30 is a front perspective view of protective apparel embodiment.

FIGS. 27-29 depict a yoke 2701 coupling to a yoke receiver 2720, according to an embodiment. Specifically, FIG. 27 is a side view of yoke 2701 coupling to yoke receiver 2720 in a first configuration (prior to coupling), FIG. 28 is a side view of yoke 2701 coupling to yoke receiver 2720 in a second configuration (after coupling); and FIG. 29 is a perspective view of yoke 2701 coupling to yoke receiver 2720 in the first configuration. Yoke 2701 can include shoe 2703 configured to be received by a boot 2724 of yoke receiver 2720, and a shoulder pad 2705 configured to rest on a shoulder plate 2722 of yoke receiver 2720. In some embodiments, yoke receiver can be integral to, and/or otherwise coupled to, a securement device (e.g., harness, shirt, etc). As shown in FIGS. 27 and 30, yoke 2701 can be moved in direction DD such that shoe 2703 is moved into boot 2724 and can be moved in direction EE such that shoulder pad 2705 is disposed on shoulder plate 2720. As shown in FIGS. 27 and 29, shoe 2703 and boot 2724 can be sized, e.g., can include a complimentary taper, such that shoe 2703 can be easily maneuvered into boot 2724. In some embodiment, yoke receiver 2720 can be monolithically formed, in other embodiments; yoke receiver 2720 can be separately formed. Yoke receiver 2720 can include material similar to yoke 2701 and/or can include different materials.

While the present disclosure and what the best modes of the inventions have been described in a manner establishing possession hereof by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims. For example, while references have been made to specific dimensions, in other embodiments the dimensions can be different. For example, protective apparel and support apparatus described herein can be manufactured in sizes, e.g., small, medium, large, one size fits all, etc. In other examples, any yoke, vision shield, protective apparel, and/or securement device can be used with any combination of yoke, vision shield, protective apparel, and/or securement device, except for mutually exclusive combinations. Furthermore, in some embodiments, a yoke, and/or features of a yoke, can be integral with a securement device.

What is claimed is:

1. A protective apparel and support apparatus, comprising:

a barrier portion that separates an interior barrier space from an exterior space, the barrier portion comprising a transparent shield; and a yoke configured to rest on the shoulders of a wearer, the yoke comprising:

a first chest member comprising a first fan and an inlet, wherein the first fan draws air from the exterior space and discharges it through the inlet into the interior space, and a second chest member comprising a second fan and an outlet, wherein the second fan draws air from the interior space through the outlet and discharges it into the exterior space;

wherein the transparent shield attaches to the yoke.

2. The protective apparel and support apparatus of claim 1 wherein the inlet comprises a plurality of inlets.

3. The protective apparel and support apparatus of claim 1 wherein the outlet comprise a plurality of outlets.

4. The protective apparel and support apparatus of claim 1 further comprising a lateral chest member.

5. The protective apparel and support apparatus of claim 1 wherein the first chest member comprises a first battery compartment.

6. The protective apparel and support apparatus of claim 5 wherein a first battery is inserted into the first battery compartment.

7. The protective apparel and support apparatus of claim 6 wherein the first battery powers the first fan.

8. The protective apparel and support apparatus of claim 6 wherein the first battery may be removed from the first battery compartment and replaced while the yoke is being worn by the wearer.

9. The protective apparel and support apparatus of claim 6 wherein the first battery may be removed from the first battery compartment and replaced without removing the yoke from the wearer.

10. The protective apparel and support apparatus of claim 6 wherein the second chest member comprises a second battery compartment and a second battery is inserted into the second battery compartment.

11. The protective apparel and support apparatus of claim 10 wherein the second battery powers the second fan.

12. The protective apparel and support apparatus of claim 10 wherein the second battery may be removed from the second battery compartment and replaced while the yoke is being worn by the wearer.

13. The protective apparel and support apparatus of claim 10 wherein the second battery may be removed from the second battery compartment and replaced without removing the yoke from the wearer.

14. The protective apparel and support apparatus of claim 6 wherein the first chest member comprises a forward end and a rearward end, and wherein the first battery compartment is adjacent to the rearward end.

15. The protective apparel and support apparatus of claim 14 wherein a weight of the first battery inserted into the first battery compartment counterbalances at least a portion of a weight of the first chest member.

16. The protective apparel and support apparatus of claim 14 wherein the second chest member comprises a forward end and a rearward end, and wherein a lateral chest member extends between the first chest member forward end and the second chest member forward end.

17. The protective apparel and support apparatus of claim 16 wherein a weight of the first battery inserted into the first battery compartment counterbalances at least a portion of a weight of the lateral chest member.

18. The protective apparel and support apparatus of claim 16 wherein the transparent shield is attached to the lateral chest member, and wherein a weight of the first battery inserted into the first battery compartment counterbalances at least a portion of a weight of the transparent shield.

19. The protective apparel and support apparatus of claim 18 wherein the second chest member comprises a second battery compartment and a second battery is inserted into the second battery compartment; and wherein a weight of the second battery inserted into the second battery compartment counterbalances at least a portion of a weight of the transparent shield.

20. A protective apparel and support apparatus, comprising:

a barrier portion that separates an interior barrier space from an exterior space, the barrier portion comprising a transparent shield; and a yoke configured to rest on the shoulders of a wearer, the yoke comprising:

a first chest member comprising a forward end and a rearward end and further comprising a first fan, an inlet, and a first battery inserted into a first battery compartment, wherein the first fan draws air from the exterior space and discharges it through the inlet into the interior space; and a second chest member comprising a forward end and a rearward end and further comprising a second fan, an outlet, and a second battery inserted into a second battery compartment, wherein the second fan draws air from the interior space through the outlet and discharges it into the exterior space;

wherein the first battery compartment is adjacent to the rearward end of the first chest member, and a weight of the first battery inserted into the first battery compartment counterbalances at least a portion of a weight applied to the first chest member; and wherein the second battery compartment is adjacent to the rearward end of the second chest member, and a weight of the second battery inserted into the second battery compartment counterbalances at least a portion of a weight applied to the second chest member.

* * * * *